United States Patent
Takemura et al.

(10) Patent No.: US 11,373,211 B2
(45) Date of Patent: Jun. 28, 2022

(54) INFORMATION PROCESSING APPARATUS AND INFORMATION PROCESSING METHOD

(71) Applicant: TOYOTA JIDOSHA KABUSHIKI KAISHA, Toyota (JP)

(72) Inventors: Kazuaki Takemura, Nagoya (JP); Yuko Mizuno, Nagoya (JP); Kohei Muto, Toyota (JP); Keiko Nagatomi, Toyota (JP); Masatoshi Komiyama, Handa (JP); Kuniaki Jinnai, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 31 days.

(21) Appl. No.: 16/571,307

(22) Filed: Sep. 16, 2019

(65) Prior Publication Data

US 2020/0098008 A1    Mar. 26, 2020

(30) Foreign Application Priority Data

Sep. 21, 2018    (JP) .............................. JP2018-177971

(51) Int. Cl.
*G06Q 30/02*    (2012.01)
*H04W 4/46*    (2018.01)
*G09F 21/04*    (2006.01)

(52) U.S. Cl.
CPC ..... *G06Q 30/0266* (2013.01); *G06Q 30/0244* (2013.01); *G09F 21/048* (2013.01); *H04W 4/46* (2018.02)

(58) Field of Classification Search
CPC ......... G06Q 30/02–0277; H04W 4/46; H04W 4/02; H04W 4/027; H04W 4/40; G09F 21/048; G09F 27/005; G09F 21/04
See application file for complete search history.

(56) References Cited

U.S. PATENT DOCUMENTS

2008/0077955 A1    3/2008    Haberman
2008/0134955 A1*   6/2008    Morrow .................. G09F 21/04
                                                            116/28 R
(Continued)

FOREIGN PATENT DOCUMENTS

DE    102017218786 A1 *    4/2019    ............. G09F 21/04
JP         2006-313317 A       11/2006
(Continued)

OTHER PUBLICATIONS

Translated JP 2013089096 A Mansahito Endo, May 13, 2013. pp. 1-13 (Year: 2013).*

(Continued)

*Primary Examiner* — Raquel Alvarez
(74) *Attorney, Agent, or Firm* — Oliff PLC

(57) ABSTRACT

An information processing apparatus includes a control unit configured to execute the processing of obtaining specific information, from a vehicle having an advertisement display unit, which is to be used to distribute an advertisement to be displayed by the advertisement display unit on the outside of the vehicle, selecting a plurality of vehicles based on the specific information, and controlling the plurality of vehicles to cause their advertisement display units to display the advertisement cooperatively.

8 Claims, 18 Drawing Sheets

(56) References Cited

U.S. PATENT DOCUMENTS

| | | | |
|---|---|---|---|
| 2014/0040016 A1* | 2/2014 | Amla | G06Q 30/0266 |
| | | | 705/14.45 |
| 2015/0220991 A1 | 8/2015 | Butts et al. | |
| 2016/0317074 A1 | 11/2016 | Kawai et al. | |
| 2018/0231979 A1 | 8/2018 | Miller et al. | |
| 2018/0232770 A1 | 8/2018 | Miller et al. | |
| 2018/0357668 A1 | 12/2018 | Kanemoto et al. | |
| 2019/0268743 A1* | 8/2019 | Cho | G08G 1/096791 |
| 2020/0074507 A1* | 3/2020 | Takemura | G06Q 30/0266 |
| 2020/0098007 A1 | 3/2020 | Sakurada et al. | |
| 2020/0167825 A1* | 5/2020 | Otsuka | G06F 3/1454 |

FOREIGN PATENT DOCUMENTS

| | | | | |
|---|---|---|---|---|
| JP | 2010-237411 A | | 10/2010 | |
| JP | 2013-089096 A | | 5/2013 | |
| JP | 2017-161600 A | | 9/2017 | |
| JP | 2018-526749 A | | 9/2018 | |
| JP | 2019125189 A | * | 7/2019 | ............ B60Q 1/503 |
| WO | WO-2018038545 A1 | * | 3/2018 | ......... G06Q 30/0261 |

OTHER PUBLICATIONS

Jan. 12, 2021 Office Action issued in U.S. Appl. No. 16/571,861.
Clarke, David Langton "Errors in the perception of motion in depth: Effects of a structured field-of-view", North Carolina State University, ProQuest Dissertations Publishing, 1998.
May 17, 2021 Office Action issued in U.S. Appl. No. 16/571,861.
Oct. 20, 2021 Office Action issued in U.S. Appl. No. 16/571,861.
Aug. 30, 2021 Advisory Action issued in U.S. Appl. No. 16/571,861.
Mar. 29, 2022 Notice of Allowance issued in U.S. Appl. No. 16/571,861.
Mar. 25, 2022 Corrected Notice of Allowability issued in U.S. Appl. No. 16/571,861.

* cited by examiner

| ADVERTISE-MENT ID | AREA ID | DISPLAY PERIOD | DISPLAY TIME | ADVERTISEMENT DATA TYPE | ADVERTISEMENT DATA | DISPLAY CONDITION NUMBER | DISPLAY CONDITION TYPE | DISPLAY CONDITION DISPLAY POSITION | DISPLAY AREA |
|---|---|---|---|---|---|---|---|---|---|
| ... | ... | ... | ... | ... | ... | ... | ... | ... | ... |
| T001a | D00A | 2018/04/01 ~ 2018/04/28 | 11:00-14:00 | STILL IMAGE | ... | 3 | TRUCK | LEFT SIDE | 3 |
| T001b | | | 17:00-19:00 | SLIDE SHOW | ... | | | RIGHT SIDE | — |
| T001c | | | | MOVING IMAGE | ... | 2 | VAN | LEFT&RIGHT SIDES | — |
| ... | ... | ... | ... | ... | ... | ... | ... | ... | ... |
| ... | ... | ... | ... | ... | ... | ... | ... | ... | ... |

FIG. 7

| VEHICLE ID | TYPE | DISPLAY UNIT PROPERTIES | | | | | | | |
|---|---|---|---|---|---|---|---|---|---|
| | | LEFT SIDE | | RIGHT SIDE | | REAR | | TOP | |
| | | UNIT NUMBER | DISPLAY AREA | UNIT NUMBER | DISPLAY AREA | UNIT NUMBER | DISPLAY AREA | UNIT NUMBER | DISPLAY AREA |
| V000101 | SEDAN | 2 | 1 | 2 | 1 | — | — | 1 | 1.6 |
| V000102 | VAN | 2 | 1 | 2 | 1 | 1 | 0.7 | — | — |
| V000103 | TRUCK | 1 | 3 | 1 | 3 | 1 | 4 | 1 | 10 |
| ... | ... | ... | ... | ... | ... | ... | ... | ... | ... |

FIG. 8

| DATE | TIME | LOCATION INFORMATION | SPEED INFORMATION (km/h) | TRAVEL DIRECTION | GROUP ID | ADVERTISEMENT DISPLAY STATUS | ADVERTISEMENT ID |
|---|---|---|---|---|---|---|---|
| 2018/04/20 | 11:11 | ... | 42.1 | NORTH-NORTHEAST | — | — | — |
| 2018/04/20 | 11:10 | ... | 41.8 | NORTH-NORTHEAST | — | — | — |
| 2018/04/20 | 11:09 | ... | 42.2 | NORTH-NORTHEAST | — | — | — |
| ... | ... | ... | ... | ... | ... | ... | ... |

FIG. 9

| GROUP ID | VEHICLE ID | ADVER- TISEMENT ID | TYPE | DISPLAY POSITION | DISPLAY AREA | ADVER- TISEMENT DATA | AREA ID |
|---|---|---|---|---|---|---|---|
| ... | ... | ... | ... | ... | ... | ... | ... |
| G1001 | V000103 | T001a | TRUCK | LEFT SIDE | 3 | A | D00A |
|  | V000106 |  |  |  |  | B |  |
|  | V000109 |  |  |  |  | C |  |
| ... | ... | ... | ... | ... | ... | ... | ... |

FIG. 10

INFORMATION PROCESSING APPARATUS AND INFORMATION PROCESSING METHOD

CROSS REFERENCE TO THE RELATED APPLICATION

This application claims the benefit of Japanese Patent Application No. 2018-177971, filed on Sep. 21, 2018, which is hereby incorporated by reference herein in its entirety.

BACKGROUND

Technical Field

The present disclosure relates to an information processing apparatus that uses vehicles as advertising media and an information processing method.

Description of the Related Art

Advertising using vehicles as media has been developed in recent years. For example, Japanese Patent Application Laid-Open No. 2013-089096 discloses a system that causes a plurality of vehicles provided with display units on their outer surfaces to display an advertisement cooperatively. Displaying an advertisement by a plurality of vehicles in a cooperative manner can lead to an improvement in the effectiveness of the advertisement.

SUMMARY

However, the aforementioned prior art teaches nothing about selecting a plurality of vehicles to form a group of vehicles and causing the vehicles in the group to display advertisement cooperatively.

An object of the present disclosure is to provide the technology of selecting a plurality of vehicles to form a group of vehicles and causing them to display advertisement cooperatively.

According to one aspect of the present disclosure, there is provided an information processing apparatus. The information processing apparatus comprises a control unit configured to execute the processing of obtaining specific information, from a vehicle having an advertisement display unit, which is to be used to distribute an advertisement to be displayed by the advertisement display unit on the outside of the vehicle, selecting a plurality of vehicles based on the specific information, and controlling the plurality of vehicles to cause their advertisement display units to display the advertisement cooperatively.

According to another aspect of the present disclosure, there is provided an information processing method. The information processing method may comprise obtaining specific information, from a vehicle having an advertisement display unit, which is to be used to distribute an advertisement to be displayed by the advertisement display unit on the outside of the vehicle, selecting a plurality of vehicles based on the specific information, and controlling the plurality of vehicles to cause their advertisement display units to display the advertisement cooperatively.

According to another aspect of the present disclosure, there is provided a program to be executed by a computer. The program may be configured to cause a computer to execute the processing of obtaining specific information, from a vehicle having an advertisement display unit, which is to be used to distribute an advertisement to be displayed by the advertisement display unit on the outside of the vehicle, selecting a plurality of vehicles based on the specific information, and controlling the plurality of vehicles to cause their advertisement display units to display the advertisement cooperatively. According to the present disclosure there is also provided a computer-readable storage medium in which the above-described program is stored in a non-transitory way.

The present disclosure can provide the technology of selecting a plurality of vehicles to form a group of vehicles and causing the vehicles in the group to display an advertisement cooperatively.

BRIEF DESCRIPTION OF THE DRAWINGS

FIG. 7 illustrates an example of advertisement information stored in an advertisement information database.

FIG. 8 illustrates an example of vehicle information stored in a vehicle information database.

FIG. 9 illustrates examples of travel records stored in a travel record database.

FIG. 10 illustrates an example of distribution information stored in a distribution information database.

DESCRIPTION OF THE EMBODIMENTS

Figure 1:
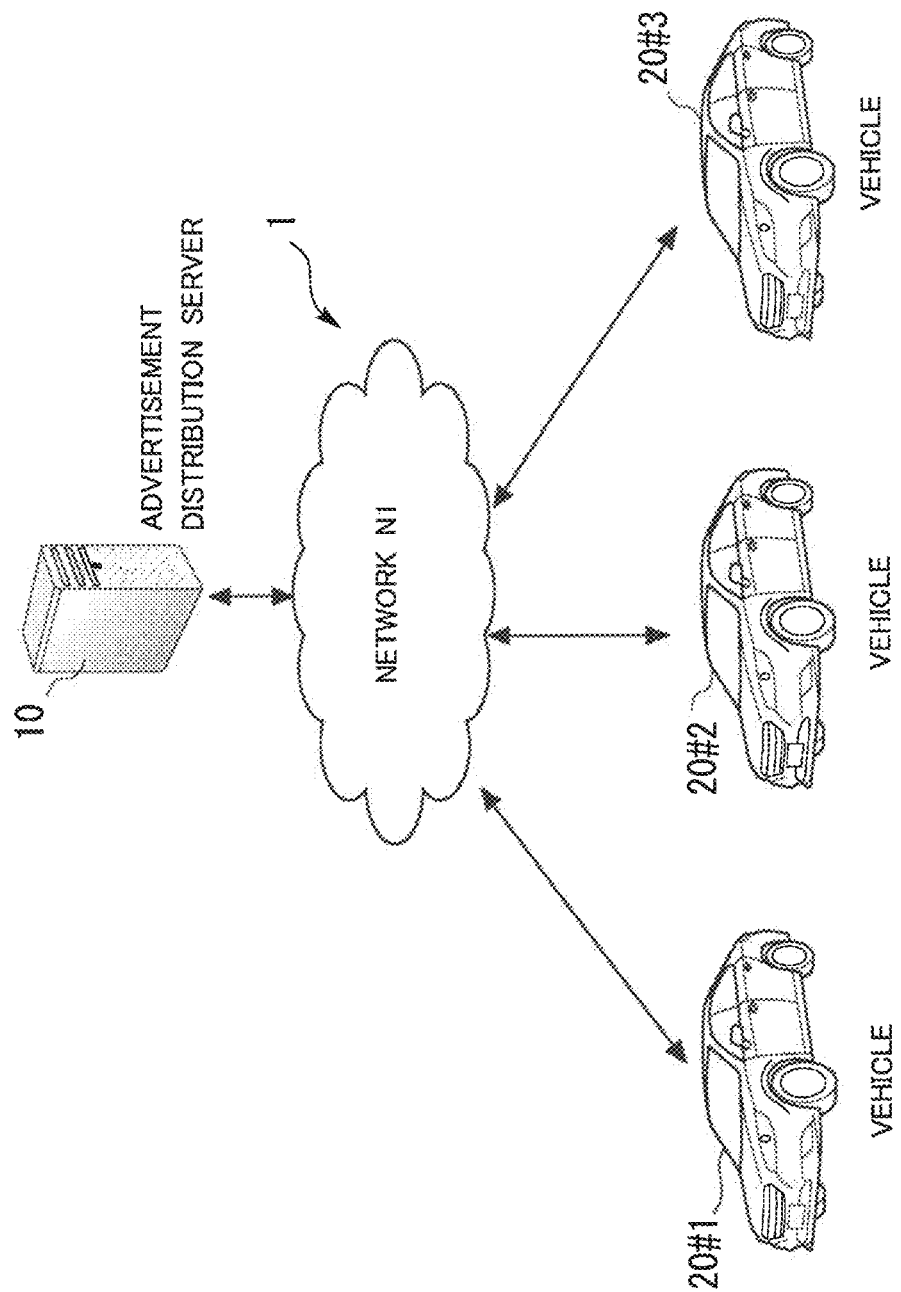
FIG. 1 is a diagram illustrating an exemplary system configuration of an advertisement display system according to a first embodiment.

An advertisement distribution server according to a first mode of an embodiment includes a control unit configured to execute the processing of obtaining specific information, from a vehicle having an advertisement display unit, which is to be used to distribute an advertisement to be displayed by the advertisement display unit on the outside of the vehicle, selecting a plurality of vehicles based on the specific information, and controlling the plurality of vehicles to cause their advertisement display units to display the advertisement cooperatively.

The advertisement distribution server according to this mode can select a plurality of vehicles based on the specific information obtained from vehicles having an advertisement display unit and can control the plurality of vehicles thus selected to cause their display units to display an advertisement cooperatively. This mode provides the technology of selecting a plurality of vehicles to form a group of vehicles and causing the vehicles in the group to display an advertisement cooperatively.

The specific information in the first mode may include information about at least one of the type of the vehicle, the speed of travel of the vehicle, the direction of travel of the vehicle, and the location of the vehicle, and the control unit may select a plurality of vehicles that meet at least one of the following conditions:

Their vehicle types are the same.
Their speeds of travel fall in the same speed range.
Their directions of travel are the same.
Their locations are close.

When vehicles having the same vehicle property, e.g. the same vehicle type, are grouped according to this mode, uniformity in display of an advertisement can be achieved. When vehicles travelling at close speeds are grouped, unity of the advertisement displayed by display units in a cooperative manner can be achieved. When vehicles travelling in the same direction are grouped, disintegration of the displayed advertisement with travels of the vehicles can be reduced. When vehicles located close to each other are grouped, the advertisement displayed by the display units of the vehicles in a cooperative manner can give a strong impression on consumers who see it, leading to an enhancement of the effectiveness of the advertisement.

The control unit according to the first mode may be configured to further execute the processing of obtaining property information about the plurality of vehicles, the property information including information about at least one of the display area of the advertisement display unit and the position of the advertisement unit, and determining the mode of display of the advertisement based on the property information obtained from the plurality of vehicles. According to this mode, the mode of display of an advertisement can be determined in conformity with properties of the advertisement display unit, leading to enhanced efficiency of display of the advertisement.

The control unit according to the first mode may be configured to further execute the processing of detecting a change in the circumstances caused by the entrance of another vehicle between two vehicles among the plurality of vehicles or the departure of one or more vehicles among the plurality of vehicles, and changing the mode of display of the advertisement displayed by the plurality of vehicles when a change in the circumstances is detected. According to this mode, if a change in the circumstances, such as the entrance of another vehicle between two vehicles among the plurality of vehicles or the departure of one or more vehicles among the plurality of vehicles occurs, it is possible to display the advertisement in a mode suitable for the circumstances after the change.

In the following, embodiments of the present disclosure will be described with reference to the drawings. It should be understood that the following embodiments are for illustrative purpose, and modes for carrying out the present disclosure are not limited by the features of the embodiments.

First Embodiment

System Configuration

FIG. 1 is a diagram illustrating an exemplary configuration of an advertisement display system 1 according to a first embodiment. The advertisement display system 1 illustrated in FIG. 1 is configured to group vehicles each of which has a plurality of display units provided outside the vehicle body and cause the display units of the grouped vehicles to display an advertisement content cooperatively. Examples of the advertisement content includes still images, moving images (videos), and messages.

The advertisement display system 1 according to the first embodiment includes an advertisement distribution server 10 and a plurality of vehicles 20 #1, 20 #2, 20 #3, which are interconnected by a network N1. The network N1 is, for example, a public network, such as the Internet. The network N1 may include a wireless communication network, such as WiFi, a wireless cellular phone network, such as an LTE network, an LTE-Advanced network, or a 3G network, a private network, such as a VPN (Virtual Private Network), or an LAN (Local Area Network). The network N1 may include a wireless communication network of a fifth generation mobile communication system (5G).

FIG. 1 illustrates one advertisement distribution server 10 and three vehicles 20 #1-20 #3 by way of example. Two or more advertisement distribution servers 10 may be connected to the network N1. The number of vehicles connected to the network N1 is not limited to that in the illustrated case, but any number of vehicles may be connected to the network N1. In the following, vehicles that can be connected to the network N1 will be collectively referred to as "vehicles 20".

Each of the vehicles 20 has a plurality of display units provided on the outer surface of its body. Examples of the display unit include a liquid crystal display, an organic electro-luminescence display, an LED (Light Emitting Diode) matrix, and a projector. The vehicle 20 receives data of advertisement contents (or advertisement data) distributed by the advertisement distribution server 10. The vehicle 20 displays advertisement contents in the form of still images, slide shows, moving images (videos), and/or messages to the outside through its display units using the advertisement data.

Figure 2:
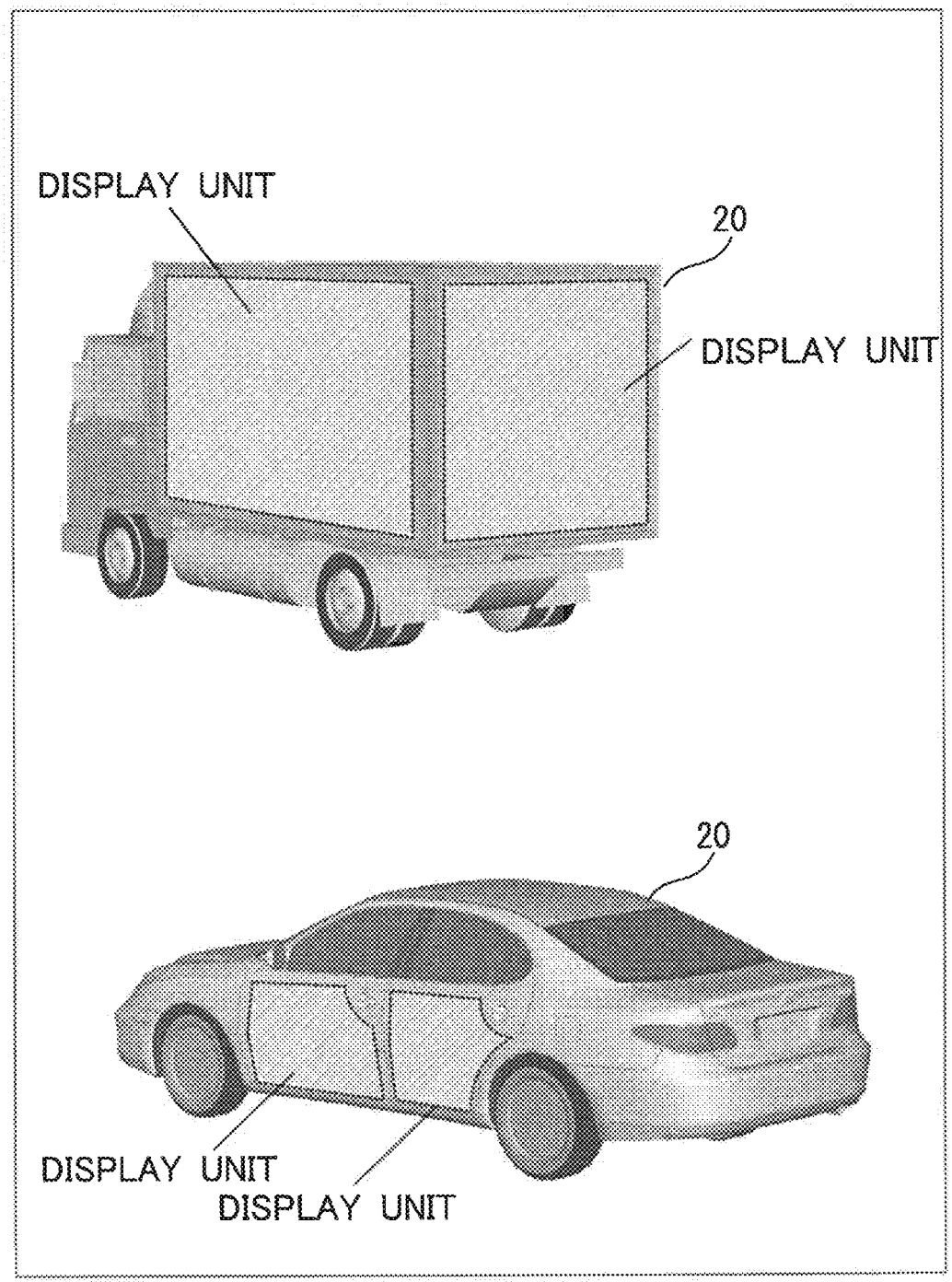
FIG. 2 illustrates the positions of display units provided on vehicles.

FIG. 2 illustrates the positions of the display units provided on vehicles 20. As illustrated in FIG. 2, a plurality of display units are provided on the outer surface of the body of each vehicle 20. Display units may be provided on different portions of the vehicle 20, for example, on the left side, the right side, the rear, and the top of the vehicle. The number of the display units provided on a vehicle 20 may vary among different types or models of vehicles 20. For example, a truck may have four display units provided on the right side, the left side, the rear, and the top of its body. A sedan may have five display units provided on the front door on the left side, the rear door on the left side, the front door on the right side, the rear door on the right side, and the roof. Display units may be provided at positions other than those described above. For example, if a vehicle 20 is equipped with a projector, images may be projected on window panes (e.g. side windows and/or rear window).

Each of the vehicles 20 according to the first embodiment illustrated in FIG. 1 sends status information that indicates its own status to the advertisement distribution server 10 periodically or in response to a request from the advertisement distribution server 10. Examples of the status information include location information (e.g. latitude and longitude) of the vehicle 20, information about its travelling speed (speed information), and information about its travelling direction. The vehicle 20 sends such information to the advertisement distribution server 10 with identification data (vehicle ID) that uniquely identifies the vehicle 20. The vehicle ID that identifies each vehicle 20 is assigned to it beforehand.

The advertisement distribution server 10 according to the first embodiment manages advertisement contents to be displayed by a plurality of vehicles 20 cooperatively. The advertisement distribution server 10 has information relating to advertisement contents to be displayed by a plurality of vehicles 20 and information relating to vehicles 20 provided with display units in its databases. The advertisement distribution server 10 receives from the vehicles 20 connected to the network N1 location information, speed information, and information about the travelling direction, which are sent periodically from the vehicles 20. The advertisement distribution server 10 conducts grouping of vehicles using the aforementioned information received from the vehicles 20 to cause them to display an advertisement content.

For example, the advertisement distribution server 10 selects a plurality of vehicles 20 located close to each other within a certain range using location information it has received from the vehicles 20. For example, the advertisement distribution server 10 selects vehicles that are waiting in line or side by side in a traffic jam or at the red signal or vehicles and located within a certain area. The advertisement distribution server 10 sends to the selected vehicles an advertisement content that can be displayed by the display units of the vehicles cooperatively.

Figure 3:
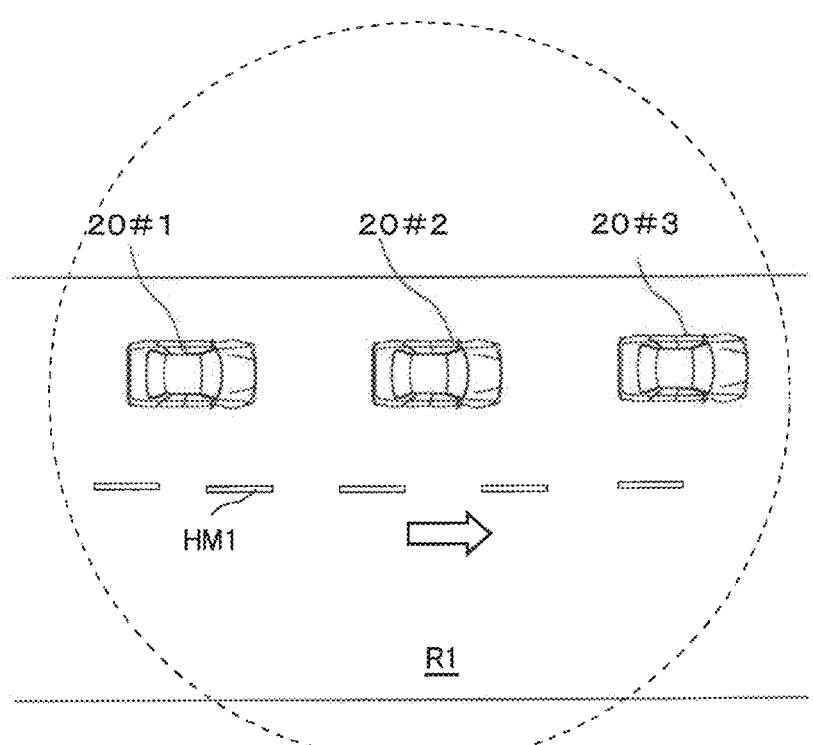
FIG. 3 is a diagram illustrating selection of vehicles.

FIG. 3 is a diagram illustrating the selection of vehicles. In FIG. 3, vehicles 20 #1, 20 #2, 20 #3 are travelling the road R1 in the direction indicated by the outline arrow. The road R1 is a two-lane road with a centerline HM1 that separates lanes in opposite directions of travel. Vehicles including the vehicles 20 #1, 20 #2, 20 #3 are at a standstill in line on the road R1 in a traffic jam or waiting for the traffic signal to change. The advertisement distribution server 10 selects vehicles (vehicles 20 #1, 20 #2, 20 #3) located within a certain area using location information sent from the vehicles. For example, the advertisement distribution server 10 selects a certain vehicle 20 #2 and vehicles 20 #1, 20 #3 respectively succeeding and preceding it within a certain area (e.g. within a radius of 10 meters). In the following, a case where three vehicles are selected will be described by way of example. It should be understood, however, the number of grouped vehicles is not limited to three.

Figure 4:
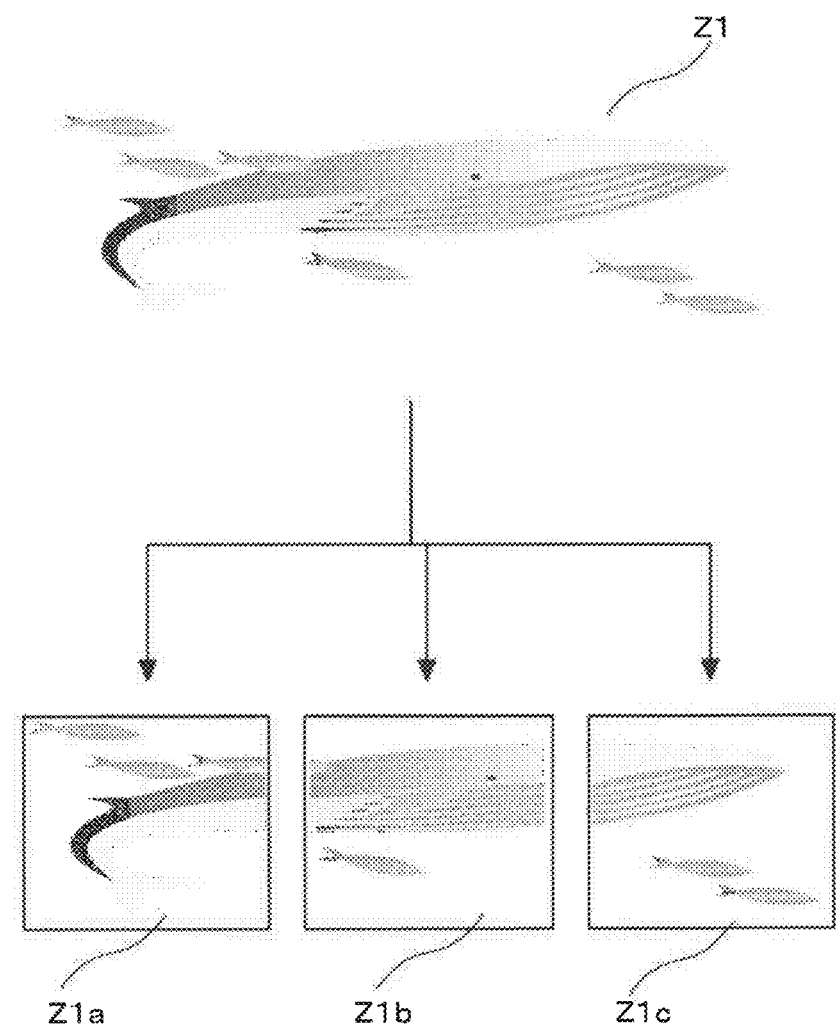
FIG. 4 illustrates an exemplary advertisement content to be displayed by display units of a group of vehicles in a cooperative manner.

FIG. 4 illustrates an exemplary advertisement content to be displayed by display units of a group of vehicles in a cooperative manner. FIG. 4 shows an exemplary advertisement content consisting of a single picture Z1 to be displayed by a virtual display apparatus (or display area) formed by display units of a group of different vehicles that operate cooperatively. The single picture Z1 is made up of a plurality of elements Z1a, Z1b, Z1c. The single-picture advertisement content may be divided into a plurality of elements by the advertisement distribution server 10 according to the number of grouped vehicles. For example, the advertisement distribution server 10 may set the origin of a two-dimensional coordinate system at the upper left corner of a display area over which a single-picture advertisement content is to be displayed and divide the two-dimensional display area extending from the origin to the lower right corner proportionally in accordance with the display areas of display units provided on a group of vehicles.

For example, the advertisement distribution server 10 sends elements Z1a, z1b, and z1c respectively to the vehicles 20 #1, 20 #2, and 20 #3. Then, the display areas of the display units provided on the left side of the respective vehicles are combined virtually to integrally display the advertisement content as a single picture Z1, which can be seen by consumers walking on the sidewalk by the road R1 (in the case of left-hand traffic). Likewise, the display areas of the display units provided on the right side of the respective vehicles are combined virtually to integrally display the advertisement content as a single picture Z1, which can be seen by consumers who are aboard vehicles travelling in the opposite lane of the road R1 and consumers walking on the sidewalk by the opposite lane. Thus, the advertisement display system 1 according to the first embodiment can virtually combine the display areas of display units provided on sides of grouped vehicles to display an advertisement content integrally. Such a mode of display of an advertisement content by the advertisement display system 1 can give a strong impression to consumers who see it, leading to an enhancement of the effectiveness of the advertisement.

If there are many apartment houses and/or office buildings along the road R1, the display units provided on the top of the vehicles may be employed to integrally display the advertisement content. Consumers in the apartment houses and/or the office buildings can see the advertisement content integrally displayed by the virtually combined display areas of the display units provided on the top of the vehicles.

The integral display can also be achieved when the vehicles 20 #1, 20 #2, 20 #3 are located side by side. For example, in the case where the road R1 has three lanes in each direction, when the vehicles 20 #1, 20 #2, 20 #3 are at a standstill side by side in respective different lanes, the display units provided on the rear of the respective vehicles may be used to integrally display an advertisement content. Consumers who are aboard the vehicles behind can see the advertisement content integrally displayed by the virtually-combined display areas of the display units provided on the rear of the vehicles.

Even when the vehicles 20 #1, 20 #2, 20 #3 are travelling, an integral advertisement content can be displayed by cooperating display units of the respective vehicles. The advertisement distribution server 10 may select travelling vehicles that are close to each other within a certain area using status information sent from the vehicles. Selecting vehicles that are travelling close to each other within a certain area can lead to enhanced effectiveness of the advertisement that is displayed by the vehicles cooperatively.

The advertisement distribution server 10 picks up vehicles whose locations indicated by location information are close to each other within a certain area. Then, the advertisement distribution server 10 selects and groups a plurality of vehicles (e.g. vehicles 20 #1, 20 #2, 20 #3), among the picked-up vehicles, that are travelling in the same direction with speed differences falling within a certain range. Grouping of vehicles that are travelling at speeds close to each other can lead to enhanced unity of the advertisement displayed by advertisement display units cooperating with each other. Moreover, grouping of vehicles that are travelling in the same direction can reduce disintegration of the displayed advertisement with travels of the vehicles.

The advertisement distribution server 10 may send to the grouped vehicles an advertisement content that can be displayed by display units provided on the grouped vehicles cooperatively. The advertisement display system 1 according to the first embodiment can select and group vehicles that can display an advertisement content integrally even when the vehicles are travelling, by using conditions relating to the speed and/or direction of travel of them.

When causing a group of vehicles to display an advertisement content cooperatively, the advertisement distribution server 10 may use the properties of the vehicles, such as the types of the vehicles in the group (e.g. van, truck, and sedan), and/or the properties of the display units, such as the sizes (display area) and the positions of the display units, as conditions for grouping.

For example, the advertisement distribution server 10 may group vehicles 20 that have the same properties (e.g. the same vehicle type). This can lead to uniformity of the group of vehicles that display an advertisement content cooperatively. The advertisement distribution server 10 may group vehicles 20 that have the same display unit properties, e.g. the size (or display area) and position. This can reduce the sense of disintegration of the advertisement content seen by consumers.

The advertisement distribution server 10 may send an advertisement content taking account of the properties of each of grouped vehicles and/or the properties of the display units thereof. For example, let us consider a case where three vehicles that differ in the display area of their display units are travelling in line in the same direction. It is assumed that the position of the display units of the vehicles is the same (e.g. on the left side).

When the aforementioned three vehicles are grouped, the advertisement distribution server 10 may send an integral advertisement content that is suitable for the display areas of the vehicles. Further, the advertisement distribution server 10 may select and send a series of advertisements to be displayed by the display units of the respective vehicles cooperatively. More specifically, for example, the advertisement distribution server 10 may divide the message "XXX MART, TURN LEFT AT NEXT SIGNAL AND GO XX METERS" into three messages "XXX MART", "TURN LEFT AT NEXT SIGNAL", and "GO XX METERS" to let the grouped three vehicles display them sequentially. The advertisement distribution server 10 may send to grouped vehicles an advertisement content that the display units of the grouped vehicles can display cooperatively, even when the vehicles and/or their display units have different properties.

Hardware Configuration

Figure 5:
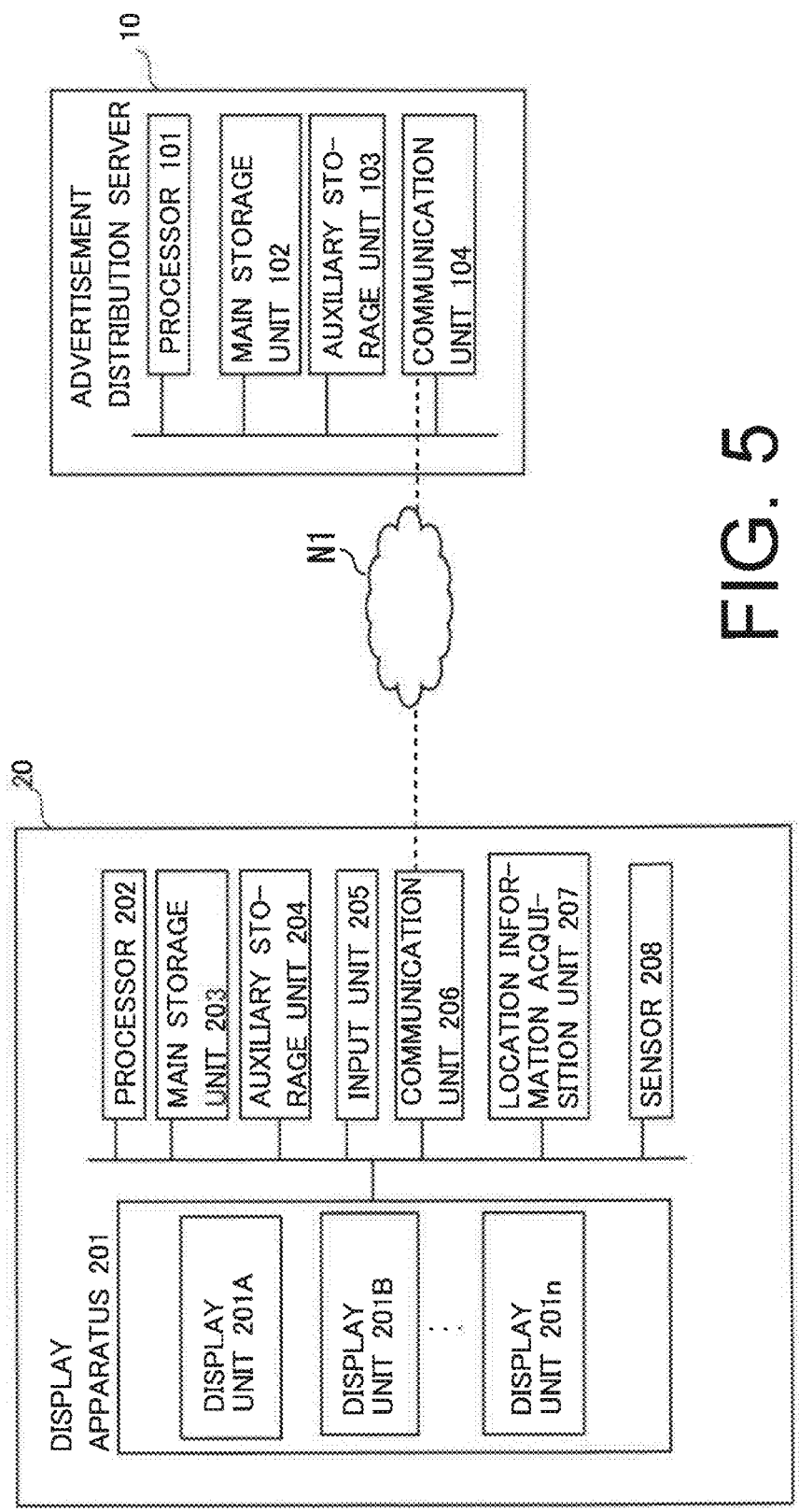
FIG. 5 is a diagram illustrating an exemplary hardware configuration of a control system provided in an advertisement distribution server and a control system provided in a vehicle.

FIG. 5 is a diagram illustrating an exemplary hardware configuration of the control systems provided in the advertisement distribution server 10 and each of the vehicles 20. The advertisement distribution server 10 is, for example, a general-purpose or dedicated computer. The advertisement distribution server 10 includes as its components a processor 101, a main storage unit 102, an auxiliary storage unit 103, and a communication unit 104, which are interconnected by buses. The main storage unit 102 and the auxiliary storage unit 103 are recording media that can be read by the advertisement distribution server 10. Each of the aforementioned components may be plural in number. One or some of the aforementioned components may be eliminated. The processor 101 of the advertisement distribution server 10 constitutes an example of the "control unit" according to the present invention.

The processor 101 is, for example, a CPU (Central Processing Unit). The processor 101 executes computer programs loaded into a workspace of the main storage unit 102 in an executable way to perform overall control of the advertisement distribution server 10. The processor 101 controls peripheral devices by executing computer programs to provide functions for achieving various purposes. The processor 101 is not limited to a single processor, but it may have a multi-processor configuration. A single CPU connected by a single socket may have a multicore configuration. Some of the processing functions provided by the advertisement distribution server 10 may be provided by a DSP (Digital Signal Processor), an ASIC (Application Specific Integrated Circuit), or a GPU (Graphics Processing Unit). One or some the processing functions may be implemented by a dedicated LSI (Large Scale Integration), such as an FPGA (Field-Programmable Gate Array), a numerical data processor, or an image processor or other digital or analogue circuit.

What is stored in the main storage unit 102 includes computer programs executed by the processor 101 and data processed by the processor 101. Examples of the main storage unit 102 include a flash memory, a RAM (Random Access Memory), and a ROM (Read Only Memory). The auxiliary storage unit is a non-transitory storage device that can write and read various programs and various data in a recording medium. The auxiliary storage unit 103 is also known as an external storage device. Examples of the auxiliary storage unit 103 include a flash memory, a HDD (Hard Disk Drive), and an SSD (Solid State Drive). The programs stored in the auxiliary storage unit 103 include an operating system (OS). The OS includes a communication interface program that performs data transfer to and from external devices connected by the communication unit 104.

The communication unit 104 is an interface to the network N1. Examples of the communication unit 104 include, a LAN (Local Area Network) interface board and a wireless communication circuit for wireless communication. The advertisement distribution server 10 is connected to the network N1 through the communication unit 104 and communicates with the vehicles 20 through the network N1.

The hardware configuration of the advertisement distribution server 10 is not limited to that illustrated in FIG. 5. The advertisement distribution server 10 can read in a program, for example stored in a portable recording medium, load it into the main storage unit 102, and execute it. Examples of the portable recording medium include a USB (Universal Serial Bus) memory and a disc recording medium, such as a CD (Compact Disc), a DVD (Digital Versatile Disc), and a Blu-ray (registered trademark) disc.

The vehicle 20 has a display apparatus 201 and a control system including a processor 202, a main storage unit 203, an auxiliary storage unit 204, an input and output unit 205, a communication unit 206, a location information acquisition unit 207, and a sensor 208. The processor 202, the main storage unit 203, the auxiliary storage unit 204, and the communication unit 206 are similar to the processor 101, the main storage unit 102, the auxiliary storage unit 103, and the communication unit 104 of the advertisement distribution server 10 and will not be described further. Each of the aforementioned components may be plural in number. One or some of the aforementioned components may be eliminated.

The display apparatus 201 includes a plurality of display units provided on the outside of the vehicle 20. As illustrated in FIG. 2, the vehicle 20 according to this embodiment has a plurality of display units 201A, 2018, . . . 201n that face outside the vehicle. The display units will be collectively designated as the display units 201, where identification of individual display units is not necessary. The vehicle 20 stores information relating to display of an advertisement content on the display units in the auxiliary storage unit 204. Examples of the information relating to display of an advertisement content include information sent to the vehicle from the advertisement distribution server 10 (such as group ID, advertisement ID, and advertisement data). The information relating to display of an advertisement includes status information indicating the status of display of an advertisement content sent to the vehicle. The display unit 201 constitutes an example of "the advertisement display unit" according to the present invention, and the vehicle 20 provided with the display unit 201 constitutes an example of the vehicle provided with the advertisement display unit according to the present invention.

Examples of the input and output unit 205 include a touch panel or push buttons by which signs such as letters can be input, a microphone by which voices can be input, and a speaker by which voice guidance and messages can be provided. The location information acquisition unit 207 is a unit configured to acquire location information of the vehicle 20. The location information acquisition unit 207 acquires information about the location (i.e. latitude and longitude) of itself, for example, using GPS signals sent from a plurality of global positioning satellites revolving around the earth. The location information acquisition unit 207 acquires the location information at a predetermined time intervals and records it with associated time information. The information recorded by the position information acquisition unit 207 is sent through the communication unit 206 to the advertisement distribution server 10 connected to the network N1 periodically or in response to a request by the advertisement distribution server 10.

The sensor 208 includes a group of sensors that senses the travelling state of the vehicle 20 and the environment around the vehicle. The sensor 208 includes one or more sensors that acquire information about the travelling state of the vehicle and information about the environment around the vehicle, such as a vehicle speed sensor, an acceleration sensor, a radar, and an azimuth sensor. The information acquired by the sensor 208 may include data relating to the degree of traffic congestion in the vicinity of the vehicle 20, data relating to the speed of other vehicles around the vehicle 20, and data relating to control of traffic signals that are obtained by road-to-vehicle communication and inter-vehicle communication. The information acquired by the sensor 208 is recorded in, for example, the auxiliary storage unit 204 with time information and sent to the advertisement distribution server 10 with the location information.

The vehicle 20 according to this embodiment sends to the advertisement distribution server 10 the aforementioned location information, speed information, and information indicating the direction of travel with identification data (e.g. vehicle ID or IP address) that uniquely identifies the vehicle 20, as will be specifically described later. When the vehicle 20 is grouped with other vehicles to display an advertisement content in cooperation with them, the vehicle 20 also sends to the advertisement distribution server 10 an group ID assigned to it, advertisement ID, and information indicating the status of display of the advertisement.

Functional Configuration.

Figure 6:
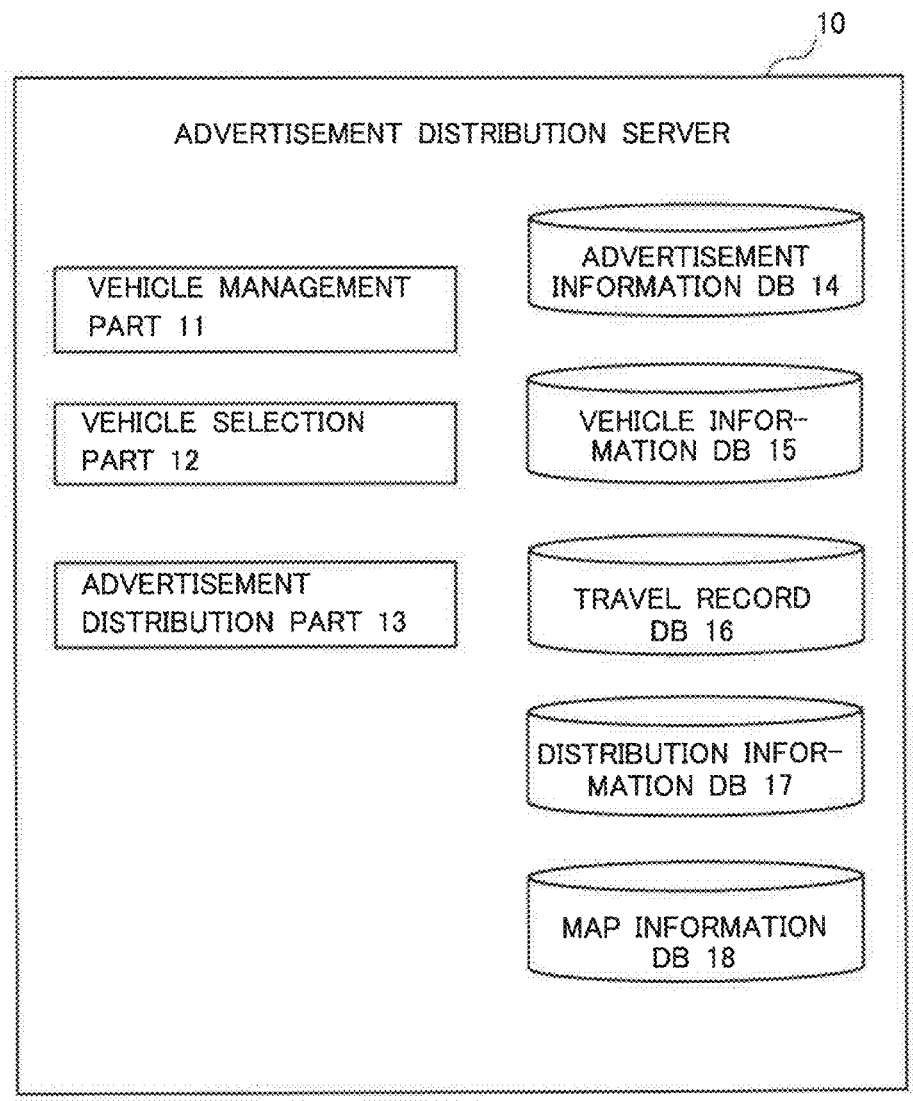
FIG. 6 is a diagram illustrating an exemplary functional configuration of the advertisement distribution server.

FIG. 6 is a diagram illustrating an exemplary functional configuration of the advertisement distribution server 10. The advertisement distribution server 10 has, as functional components, a vehicle management part 11, a vehicle selection part 12, an advertisement distribution part 13, an advertisement information database 14, a vehicle information database 15, a travel record database 16, a distribution information database 17, and a map information database 18. These functional components are implemented by, for example, executing programs stored in the auxiliary storage unit 103 by the processor 101 of the advertisement distribution server 10. Some of the functional components or a part of their processing may be implemented by a hardware circuit(s). Some of the functional components or a part of their processing may be executed by another computer connected to the network N1.

The vehicle management part 11 obtains status information sent from each vehicle 20. The status information includes location information indicating the present location of the vehicle 20, speed information, and information indicating the direction of travel. The status information constitutes an example of "the specific information" according to the present invention. In cases where the vehicle has already been grouped, the vehicle management part 11 also receives information relating to display of an advertisement content (e.g. group ID, advertisement ID, and information indicating the status of display of the advertisement) sent from the vehicle. The vehicle management part 11 creates a record in association with information indicating the time at which the status information and the information relating to the display of an advertisement content are received and stores the record in the travel record database 16. The aforementioned information is managed as a table created for each of the vehicles.

The vehicle selection part 12 selects a group of vehicles to be employed to display an advertisement content by display units of the respective vehicles in a cooperative manner on the basis of a predetermined condition. The predetermined condition is a condition used to group a plurality of vehicles. The predetermined condition relates to status information, information about the properties of vehicles, and information about the properties of display units collected from the vehicles. The vehicle selection part 12 passes information about the selected group of vehicles to the advertisement distribution part 13.

The advertisement distribution part 13 distributes an advertisement content to the selected group of vehicles. The advertisement distribution part 13 stores information about the selected group of vehicles and information about the advertisement content distributed to the group of vehicles in the distribution information database 17.

What is stored in the advertisement information database 14 is data relating to advertisement contents distributed to groups of vehicles. The advertisement distribution server 10 receives data created by advertisers that provide advertisement contents and enters them in the advertisement information database 14.

FIG. 7 illustrates an example of advertisement information stored in the advertisement information database 14. The advertisement information is managed as an advertisement information table as illustrated in FIG. 7. The fields of information in the advertisement information table may be modified (namely, added, changed, or deleted) fitly.

The exemplary advertisement table in FIG. 7 includes the fields of advertisement ID, area ID, display period, display time, type, and display condition. What is stored in the advertisement ID field is identification data (i.e. advertisement ID) that identifies an advertisement content received from an advertiser. The advertisement ID is assigned to an advertisement content when it is entered. What is stored in the area ID field is information (area ID) indicating an area in which the advertisement content is to be displayed. What is stored in the display period field is information indicating a period over which display of the advertisement content is to be performed. What is stored in the display time field is information indicating a time period (or time slot) in the day through which the advertisement content is to be displayed. What is stored in the type field is information indicating the mode of display of the advertisement content. Examples of the mode of display of advertisement contents include still image, slide show, and moving image. Examples of the mode of display may further include augmented reality (AR) containing visual information produced by computer graphics (CG) or the like and projection mapping.

What is stored in the advertisement data field is data of the advertisement content. The information stored in the advertisement data field may be an identification number that refers to advertisement data stored in another table or the like. What is stored in the display condition table is a condition placed on a group of vehicles to be employed to display the advertisement content. The display condition field in the table in FIG. 7 includes the sub-fields of number, type, display position, and display area. What is stored in the number field is information designating the number of vehicles to be employed to display the advertisement content cooperatively. What is stored in the type field is information designating the type (or properties) of the vehicles to be employed to display the advertisement content cooperatively. If there is no designation of the type of vehicles to be employed to display the advertisement content cooperatively, information indicating the absence of designation of the type (e.g. the sign "- - -") is stored in this field or alternatively, this field is left blank. What is stored in the display position field is information designating the position of the display units of the vehicles to be employed to display the advertisement content cooperatively. The information stored in this field designates the position, such as the left side, the front door on the left side, the rear door on the left side, the right side, the front door on the right side, the rear door on the right side, the rear, or the top, as has been already described with reference to FIG. 2. What is stored in the display area field is information designating the display area (in square meters) of the display units of the vehicle that are to display the advertisement content cooperatively. The information stored in the display area field may be the display area of the display units divided by unit area.

What is stored in the vehicle information database 15 is information about the properties of the vehicle 20 and the properties of the display units. Such information is stored in the vehicle information database 15 by the advertisement distribution server 10 or a computer that cooperates with the advertisement distribution server 10 at the time when each vehicle 20 is registered to the advertisement display system 1.

FIG. 8 illustrates an example of the vehicle information stored in the vehicle information database 15. The vehicle information is managed as a vehicle information table as illustrated in FIG. 8. The fields of information in the vehicle information table may be modified (namely, added, changed, or deleted) fitly.

The exemplary vehicle information table in FIG. 8 includes the fields of vehicle ID, type, display unit properties. What is stored in the vehicle ID field is identification data (i.e. vehicle ID) that uniquely identifies each vehicle 20. The vehicle ID is assigned to the vehicle 20 in association with an IP address or the like when the vehicle 20 is registered to the advertisement display system 1. What is stored in the type field is property information indicating the type of the vehicle 20, such as sedan, van, or truck. What is stored in the display unit information field is property information about the display units of the vehicle 20. The display unit properties field in FIG. 8 includes the sub-fields for the respective positions (left side, right side, rear, and top) of the display units. Each position field further includes the sub-fields of unit number and display area. What is stored in the unit number field is information indicating the number of display units provided at the position. For example, in the illustrative case in FIG. 8, the vehicle with the vehicle ID "V101" has display units provided on the front door and the rear door on the left side, and numeral "2" indicating the number of units is stored in the left side unit number field. The display area field is the same as that in FIG. 7. If there is no display unit at a certain position, information indicating the absence of display unit in that position (e.g. the sign "- - -") is stored in the corresponding fields or alternatively, such fields are left blank.

What is stored in the travel record database 16 is records of status information collected from the vehicles 20 that are travelling on roads. The travel record database 16 stores records of status information of each of the vehicles registered in the advertisement display system 1. FIG. 9 illustrates examples of the travel record stored in the travel record database 16. The travel records are managed as a record table for each of the vehicles. The fields of information in the record table may be modified (namely, added, changed, or deleted) fitly.

The exemplary record table in FIG. 9 includes the fields of date, time, location information, travel direction, group ID, advertisement display status, and advertisement ID. What is stored in the date field is information indicating the date on which status information was obtained. What is stored in the time field is information indicating the time at which the status information was obtained. What is stored in the location information field is location information (e.g. latitude and longitude) indicating the location of the vehicle 20 at that time. What is stored in the speed information field is information indicating the speed (in Km/h) of the vehicle 20 at that time. What is stored in the travel direction field is information indicating the direction of travel of the vehicle 20 (e.g. the azimuth direction with respect to the north). What is stored in the group ID field is identification data (group ID) that identifies the vehicle group to which the vehicle 20 belongs. When the group ID is not assigned, information indicating that no group ID is assigned (e.g. the sign "- - -") is stored in this field or alternatively, this field is left blank.

What is stored in the advertisement display status field is information indicating the status of display of the advertisement content sent to the group of vehicles. For example, when the advertisement content is being displayed, "displayed" is stored in this field. When the advertisement content is not being displayed, "not displayed" is stored in this field. When no advertisement content is assigned, information indicating that no advertisement content is assigned (e.g. the sign "- - -") is stored in this field or alternatively, this field is left blank. What is stored in the advertisement ID field is identification data (advertisement ID) that identifies the advertisement content sent to the group of vehicles. When the advertisement ID is absent, in other words, when a group ID is not assigned, information indicating the absence of advertisement ID (e.g. the sign "- - -") is stored in this field or alternatively, this field is left blank.

What is stored in the distribution information database 17 is information about selected groups of vehicles and information about advertisement contents distributed to the respective groups of vehicles. FIG. 10 illustrates an example of distribution information stored in the distribution information database 17. The distribution information is managed as a distribution information table as illustrated in FIG. 10. The fields of information in the distribution information table may be modified (namely, added, changed, or deleted) fitly.

The exemplary distribution information table in FIG. 10 includes the fields of group ID, vehicle ID, type, display position, display area, advertisement data, and area ID. The group ID field and the advertisement ID field are the same as those in FIG. 9 and will not be described further. The vehicle ID field is the same as that in FIG. 8 and will not be described further. The fields of type, display position, display area, advertisement data, and area ID are the same as those in FIG. 7 and will not be described further.

In the illustrated case shown in FIG. 10, a group of three vehicles respectively having vehicle IDs of "V000103", "V000106", and "V000109" is assigned with a group ID of "G1001". All the three vehicles are of the type "truck", and each vehicle has a display unit having an display area of "3" on its left side. The vehicles in the group assigned with the group ID "G1001" display an advertisement content identified by an advertisement ID of "T001$a$" integrally in cooperation with each other. The vehicle having the vehicle ID of "V000103" displays advertisement data A, the vehicle having the vehicle ID of "V000106" displays advertisement data B, and the vehicle having the vehicle ID of "V000109" displays advertisement data C. Here, it is assumed that the advertisement content identified by an advertisement ID of "T001$a$" is the single picture Z1 shown in FIG. 4. The vehicles in the group assigned with the group ID of "G1001" can display the advertisement data A corresponding to the element Z1$a$, the advertisement data B corresponding to the element Z1$b$, and the advertisement data C corresponding to the element Z1$c$.

Referring back to FIG. 6, the map information database 18 stores map information including map data including the locations of features on the ground and textual and pictorial POI (Point Of Interest) information illustrating features of places in the map. The map information database 18 may be provided by another system connected to the network N1, e.g. a geographic information system (GIS).

Process Performed by Vehicles

Figure 11:
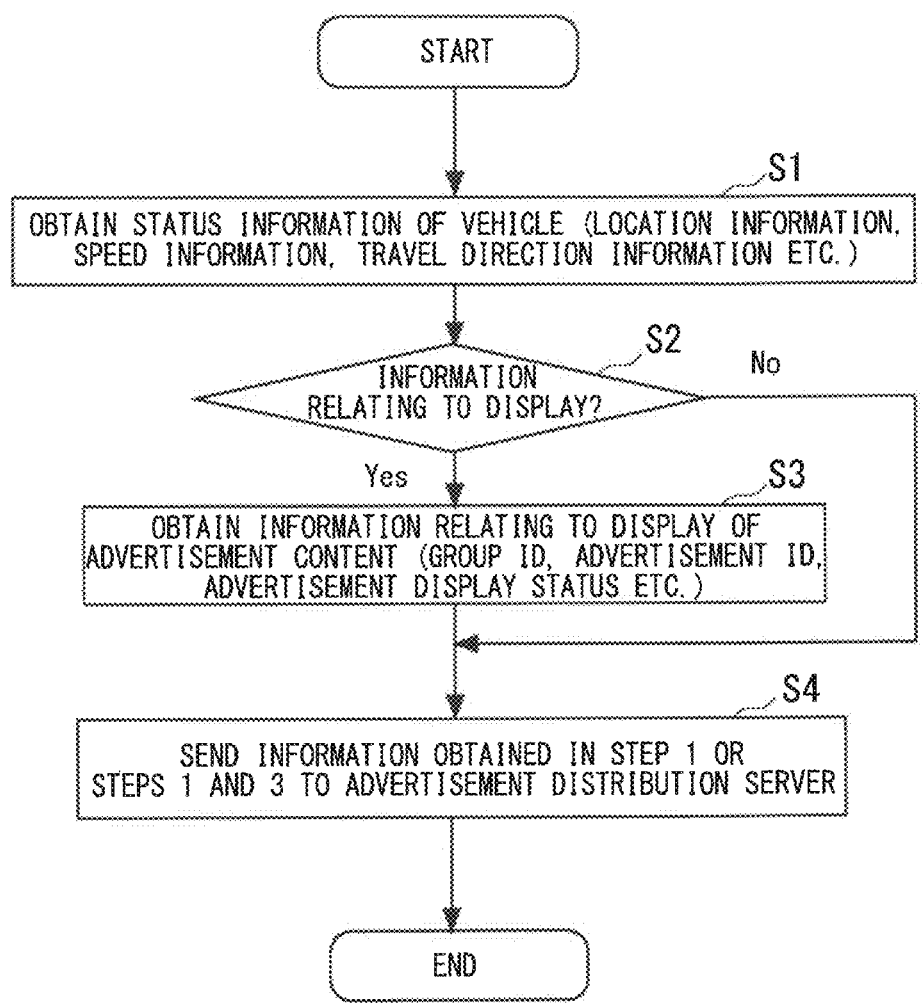
FIG. 11 is a flow chart of an exemplary processing of sending information relating to display of an advertisement content.

Next, a process performed by each vehicle 20 according to the first embodiment will be described with reference to FIG. 11. FIG. 11 is a flow chart of a process of sending information relating to display of an advertisement content. The process in FIG. 11 is performed on predetermined occasions (e.g. at regular intervals or in response to a request from the advertisement distribution server 10).

In step S1 of the process according to the flow chart in FIG. 11, the vehicle 20 obtains status information indicating the status of the vehicle 20. Specifically, the vehicle 20 obtains location information, speed information, and information indicating the direction of travel at the present time by the location information acquisition unit 207 and the sensor 208. The vehicle 20 stores status information thus obtained with associated time information in a certain area of the main storage unit 203 temporarily, and the process proceeds to the processing of step S2. The vehicle 20 may obtain data of the degree of traffic congestion in the vicinity of the vehicle 20, data relating to the speed of other vehicles around the vehicle 20 (specifically, the speed of other vehicles 20 that are travelling ahead, behind, or side by side and their vehicle IDs), and data relating to control of traffic signals by road-to-vehicle communication and/or inter-vehicle communication and add such data to the status information.

In step S2, it is determined whether or not the vehicle 20 has been put in a group of vehicles that are to display an advertisement content cooperatively. If the vehicle 20 has been put in a group, information relating to display of an advertisement content sent from the advertisement distribution server 10 has been stored in the auxiliary storage unit 204 or other component. The vehicle 20 consults the auxiliary storage unit 204 or other component to determine whether or not the information relating to display of an advertisement content is stored in it.

If the aforementioned information is stored in the auxiliary storage unit 204 or other component (Yes in step S2), the vehicle 20 executes the processing of step S3 next. On the other hand, if the aforementioned information is not stored in the auxiliary storage unit 204 or other component (No in step S2), the vehicle 20 executes the processing of step S4 next.

In step S3, the vehicle 20 retrieves information relating to display of an advertisement content. Specifically, the vehicle 20 consults the auxiliary storage unit 204 or other component to retrieve the advertisement ID and the group ID sent from the advertisement distribution server 10 to it and the status information indicating the status of display of the advertisement. The information relating to display of the advertisement content thus retrieved is passed to the processing of step S4 with associated time information.

In step S4, the vehicle 20 sends the information obtained in step S1 or information obtained in steps S1 and S3 to the advertisement distribution server 10. More specifically, the vehicle 20 sends the information in association with the vehicle ID assigned to the vehicle 20 to the advertisement distribution server 10. After the completion of the processing of step S4, the process of the flow chart in FIG. 11 ends.

The vehicle 20 can send the status information relating to the state of travelling of itself to the advertisement distribution server 10 by the above process. Moreover, when the vehicle 20 has been put in a group of vehicles that are to display an advertisement content cooperatively, the vehicle 20 can send information relating to display of the advertisement content (e.g. group ID, advertisement ID, and advertisement display status) to the advertisement distribution server 10. The advertisement distribution server 10 can select a group of vehicle to be employed to display an advertisement content cooperatively using the status information and the information relating to display of an advertisement content sent from the vehicles 20.

Process Performed by the Advertisement Distribution Server

Figure 12:
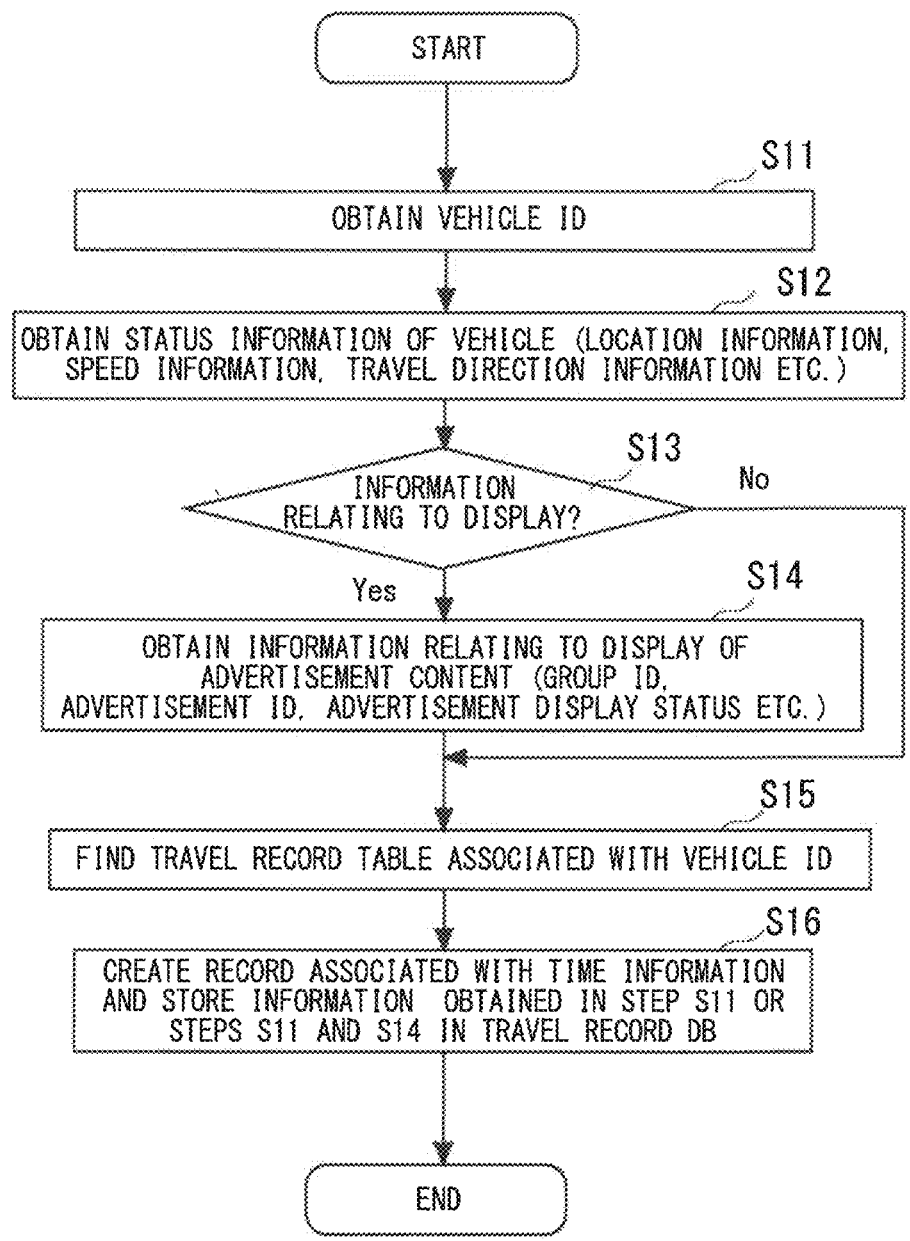
FIG. 12 is a flow chart of an exemplary vehicle management process.

Next, a process performed by the advertisement distribution server 10 according to the first embodiment will be described with reference to FIGS. 12 to 14. FIG. 12 is a flow chart of a vehicle management process. The advertisement distribution server 10 obtains the status information and the information relating to display of an advertisement content sent from each of the vehicles 20.

The process according to the flow chart in FIG. 12 is started, for example, when the status information and the information relating to display of an advertisement content have sent from a vehicle 20. In step S11, the advertisement distribution server 10 obtains the vehicle ID sent from the vehicle 20). The vehicle ID obtained here is passed to the processing of step S15. The advertisement distribution server 10 also obtains the status information associated with this vehicle ID in step S12. In the case where the status data includes data of the degree of traffic congestion in the vicinity of the vehicle 20, data relating to the speed of other vehicles around the vehicle 20, and data relating to control of traffic signals obtained by road-to-vehicle communication and/or inter-vehicle communication, they are obtained as the status information. The data relating to the speed of other vehicles includes the speed of other vehicles 20 that are travelling ahead, behind, or side by side and their vehicle IDs. The advertisement distribution server 10 temporarily stores the obtained status information in a certain area of the main storage unit 102. Then, the processing of step S13 is executed next.

In step S13, the advertisement distribution server 10 determines whether or not information relating to display of an advertisement content is included in the information sent from the vehicle 20. If information relating to display of an advertisement content is included in the information sent from the vehicle 20 (Yes in step S13), the advertisement distribution server 10 executes the processing of step S14 next. On the other hand, if information relating to display of an advertisement content is not included in the information sent from the vehicle 20 (No in step S13), the advertisement distribution server 10 executes the processing of step S15 next.

In step S14, the advertisement distribution server 10 obtains the information relating to display of an advertisement content. The information relating to display of an advertisement content obtained here is passed to the processing of step S16. In step S15, the advertisement distribution server 10 searches the travel record database 16 using the vehicle ID passed from step S11 as a search key to find the specific travel record table associated with this vehicle ID.

In step S16, the advertisement distribution server 10 creates a record associated with the time information in the specific travel record table found as above and adds the information obtained in step S11 or steps S11 and S14 to this record. The travel record table associated with the vehicle ID in the travel record database 16 is updated. After the completion of the processing of step S16, the process of the flow chart in FIG. 12 ends.

By the above process, the advertisement distribution server 10 can search the travel record database DS16 using the vehicle ID of the vehicle 20 and find the travel record table associated with the vehicle ID. The advertisement distribution server 10 can record the status information relating to the state of travel of the vehicle 10 having this vehicle ID (including location information, speed information, and information indicating the direction of travel) in the travel record table thus found. Likewise, the advertisement distribution server 10 can record the information relating display of an advertisement content (including group ID, advertisement ID, and information indicating the status of display) in the travel record table associated with the vehicle ID. The advertisement distribution server 10 can select a group of vehicles to be employed to display an advertisement content cooperatively on the basis of the status information and information relating to display of an advertisement content stored in the travel record database 16 in association with the respective vehicle IDs.

Next, a process will be described with reference to FIGS. 13 and 14. FIGS. 13 and 14 show a flow chart of an advertisement distribution process. By the process according to the flow chart in FIGS. 13 and 14, the advertisement distribution server 10 groups a plurality of vehicles 20 that meet a certain condition as a group of vehicles and sends an advertisement content that can be displayed by display units of the group of vehicles in an cooperative manner. The process according to the flow chart in FIGS. 13 and 14 is executed at regular intervals for each advertisement ID by consulting the advertisement information database 14 and the travel record database 16.

Figure 13:
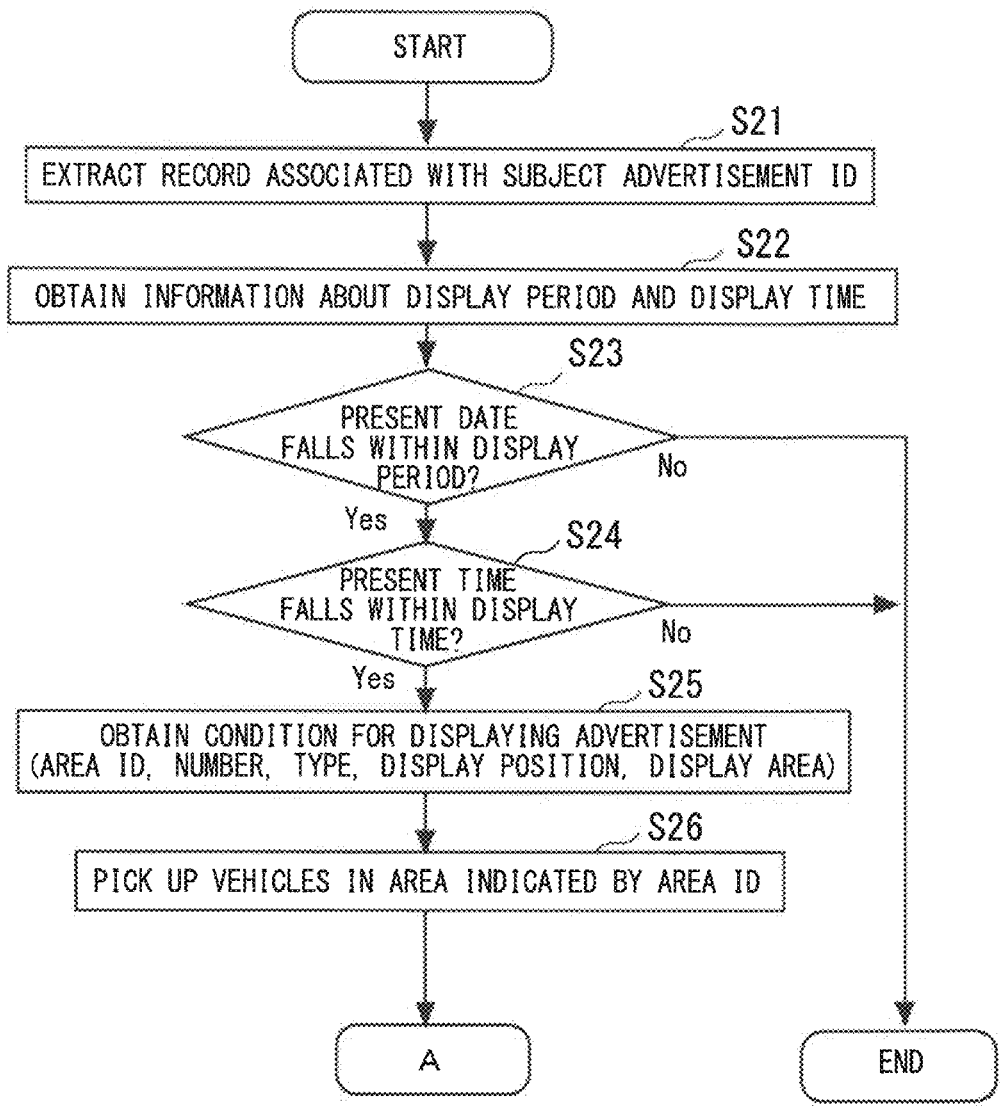
FIGS. 13 and 14 show a flow chart of an exemplary advertisement distribution process.

In step S21 of the process according to the flow chart in FIG. 13, the advertisement distribution server 10 consults the advertisement information database 14 to extract the record associated with the advertisement ID for which this process is executed. The extracted record is temporarily stored in a certain area of the main storage unit 102. In step S22, the advertisement distribution server 10 obtains information indicating the display period and the display time from the extracted record.

In step S23, the advertisement distribution server 10 determines whether or not the present date falls within the display period. If the present date falls within the display period (Yes in step S23), the advertisement distribution server 10 executes the processing of step S24 next. On the other hand, if the present date does not fall within the display period (No in step S23), the advertisement distribution server 10 terminates the process illustrated in FIGS. 13 and 14.

In step S24, the advertisement distribution server 10 determines whether or not the present time falls within the designated display time (time slot). If the present time falls within the designated display time (Yes in S24), the advertisement distribution server 10 executes the processing of step S25 next. On the other hand, if the present time does not fall within the designated display time (No in step S24), the advertisement distribution server 10 terminates the process illustrated in FIGS. 13 and 14.

In step S25, the advertisement distribution server 10 obtains the condition for displaying the advertisement content. The advertisement distribution server 10 retrieves the area ID stored in the extracted record and the information designating the number, type, display position, and display area stored in the display condition field. The area ID is passed to the processing of step S26, and the information stored in the display condition field is passed to the processing of step S27.

In step S26, the advertisement distribution server 10 picks up a plurality of vehicles 20 that are presently located in the area indicated by the area ID. For example, the advertisement distribution server 10 consults the travel record database 16 to pick up all the vehicles 20 whose present locations are in the area identified by the area ID from among the vehicles 20 whose group ID field is blank or reads "- - -". Information about the picked-up vehicles 20 are passed to the processing of step S27. All the picked-up vehicles 20 will also be referred to as "all the in-area vehicles" hereinafter.

Figure 14:
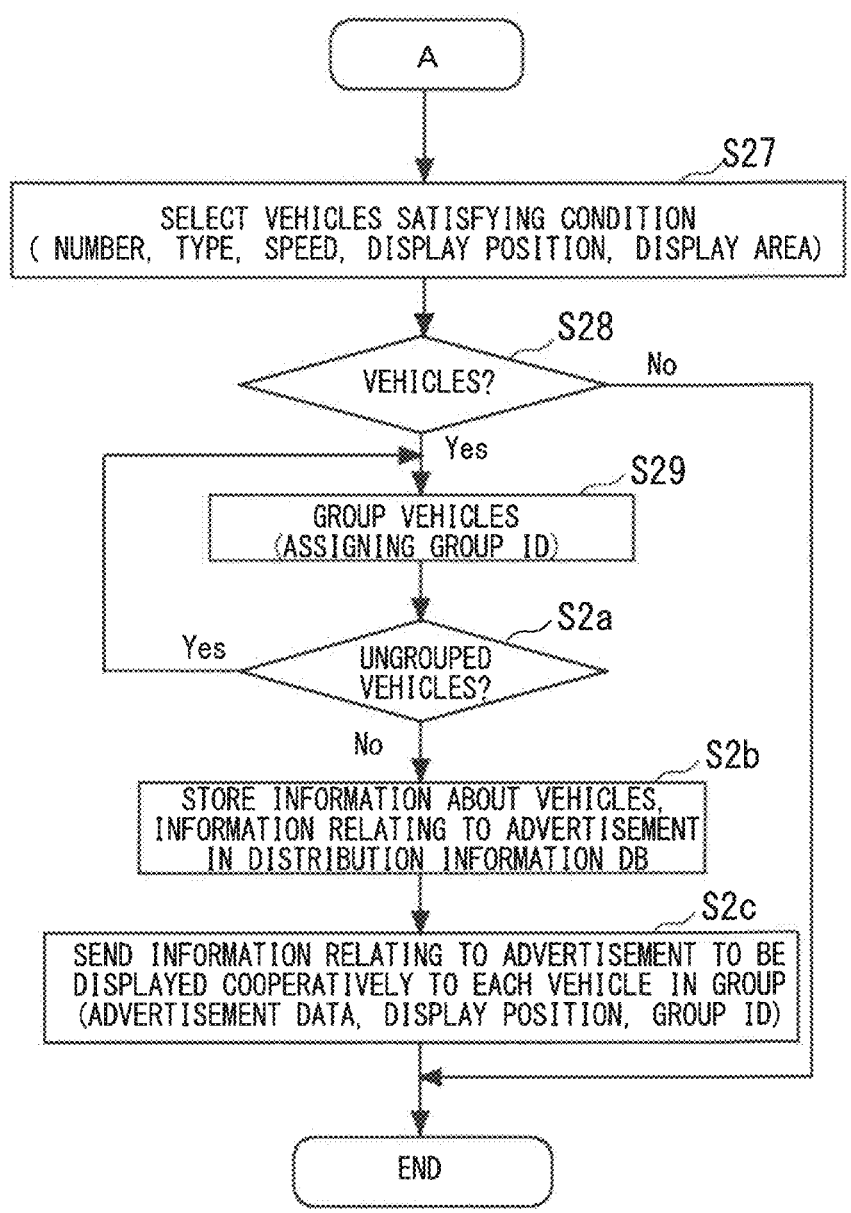

In step S27 in FIG. 14, the advertisement distribution server 10 selects vehicles that meet the condition for cooperative display of the advertisement content from among all the in-area vehicles. The vehicles thus selected will also be referred to as the "display vehicles" hereinafter. For example, the advertisement distribution server 10 selects such vehicles that are located at locations (indicated by the location information) within a certain area and travelling in the same direction with differences in their speeds (indicated by the speed information) smaller than a certain value (e.g. ±2 km/h) from among all the in-area vehicles. The aforementioned certain area is determined dynamically according to the travelling speed of vehicles in question. For example, if the travelling speed is approximately 40 km/h, vehicles located within an area having a diameter of 80 meters may be selected. If the travelling speed is lower than 10 km/h due to a traffic jam, red signal or other reasons, vehicles located within an area having a diameter of 40 meters may be selected.

The advertisement distribution server 10 may consult the map information database 18 to select the aforementioned vehicles. The advertisement distribution server 10 may use map data of the area corresponding to the area ID to determine the road that vehicles 20 are travelling and the locations of traffic signals provided in that road. The advertisement distribution server 10 may access a vehicle information and communication system (VICS: registered trademark) or the like to obtain information about traffic jam. When selecting vehicles, the advertisement distribution server 10 may take account of data of the degree of traffic congestion in the vicinity of each vehicle 20, data relating to the speed of other vehicles around each vehicle 20 (specifically, the speed of other vehicles 20 that are travelling ahead, behind, or side by side and their vehicle IDs), and data relating to control of traffic signals obtained by each vehicle 20 by road-to-vehicle communication and/or inter-vehicle communication.

The advertisement distribution server 10 further selects displaying vehicles to be employed to display the advertisement content cooperatively from among the vehicles selected as above based on the location information, the speed information and the information about the direction of travel. For example, the advertisement distribution server 10 searches the vehicle information database 15 using the respective vehicle IDs of the vehicles 20 selected as above as search keys to obtain information about the properties of the vehicles, such as the vehicle type and information about the properties of the display units of the vehicles, such as the display position and the display area. Then, the advertisement distribution server 10 selects vehicles that have properties that satisfy the condition for displaying the advertisement content specified in the record associated with the advertisement ID as a group of displaying vehicles to be employed to display the advertisement content cooperatively. In the case of the advertisement ID of "T001a" in FIG. 7, three vehicles that are of the vehicle type "truck" and each have a display unit having a display area of three square meters on the left side are selected as a group of vehicles to be employed to display the advertisement content cooperatively. The advertisement distribution server 10 temporarily stores information about the vehicles thus selected in a certain area of the main storage unit 102 and then executes the processing of step S28 next.

In step S28, the advertisement distribution server 10 determines whether or not there is a group of vehicles that satisfies the condition for displaying the advertisement content. If there is a group of vehicles that satisfies the condition for displaying the advertisement content (Yes in step S28), the advertisement distribution server 10 executes the processing of step S29 next. If there is not a group of vehicles that satisfies the condition for displaying the advertisement content (No in step S28), the advertisement distribution server 10 ends the process illustrated in FIGS. 13 and 14.

In step S29, the advertisement distribution server 10 assigns a group ID to the vehicles selected as above to group them. The group ID assigned to the vehicles is passed to the processing of step S2b.

In Step S2a, it is determined whether there remains vehicles that have not been grouped. If there are vehicles that have not been grouped (Yes in step S2a), the advertisement distribution server 10 executes the processing of step S29 again. On the other hand, If there are no vehicles that have not been grouped (No in step S2a), the advertisement distribution server 10 executes the processing of step S2b next. By the processing of step S2a, the advertisement distribution server 10 can assign group IDs to a plurality of groups of vehicles each of which can display the subject advertisement content cooperatively.

In step S2b, the advertisement distribution server 10 records the groups of vehicles to which the respective group IDs have been assigned in the distribution information database 17 with associated information relating to the advertisement distributed to the groups of vehicles. The advertisement distribution server 10 creates records for respective group IDs assigned to the groups and stores information indicating the advertisement ID and the area ID of the advertisement content to be displayed in the record for each group ID. The advertisement distribution server 10 also stores in the record for each group ID, information indicating the vehicle IDs of the vehicles in the group, the vehicle types of the vehicles, the positions of their display units, and the display areas of their display units. The advertisement distribution server 10 stores pieces of data of the advertisement content (advertisement data) to be displayed in a cooperative manner in association with the respective vehicle IDs of the vehicles that are to display the advertisement content using the respective pieces of advertisement data. For example, in the case of the advertisement content illustrated in FIG. 3, a piece of advertisement data corresponding to the element Z1c in FIG. 4 is stored in association with the vehicle ID of the vehicle 20 #3. Likewise, a piece of advertisement data corresponding to the element Z1b in FIG. 4 is stored in association with the vehicle ID of the vehicle 20 #2, and a piece of advertisement data corresponding to the element Z1a is stored in association with the vehicle ID of the vehicle 20 #1.

In step S2c, the advertisement distribution server 10 sends information relating to the advertisement to be displayed in an cooperative manner to the grouped vehicles having a group ID assigned thereto. The advertisement distribution server 10 designates the vehicle IDs of the respective vehicles belonging to the group and sends the group ID of the group and advertisement data to them. After the completion of the processing of step S2c, the process according to the flow chart in FIGS. 13 and 14 end.

Each of the vehicles in a group receives information relating to the advertisement sent from the advertisement server 10, which includes the group ID of the group, advertisement data to be used by each of the vehicles to display the advertisement, information about the position (or display position) of the display unit to be used to display the advertisement. Each vehicle 20 stores the aforementioned information it has received in a certain area of the main storage unit 203 temporarily. The processor 202 of the vehicle 20 causes the display unit provided at the designated display position to perform display using the advertisement data. The grouped vehicles perform display at designated display positions using respective pieces of advertisement data sent to them. Thus, an integral advertisement content can be displayed by virtually combined display areas of the respective display units. The status of display with advertisement data by each vehicle 20 belonging to a group of vehicles is sent to the advertisement distribution server 10 as the advertisement display status.

By the above process, the advertisement distribution server 10 can group a plurality of vehicles 20 using the status information and information relating to display of an advertisement content sent from the vehicles 20. The condition in grouping of vehicle set by the advertisement distribution server 10 may be that differences in their speeds indicated by the speed information fall within a certain range (e.g. ±2 km/h), their locations indicated by the location information fall within a certain area, and their directions of travel are the same. Moreover, the advertisement distribution server 10 may include properties of the vehicles 20 (such as the vehicle type) and properties of display units of the vehicles 20 (such as the display position and display area) in the condition for grouping. The advertisement distribution server 10 can distribute to grouped vehicles (display vehicles) an advertisement content that display units of the grouped vehicles can display integrally in cooperation with each other. The technology of the advertisement display system 1 according to the first embodiment can cause grouped vehicles 20 to operate cooperatively to display an integral advertisement content. The advertisement display system 1 according to the first embodiment can give a strong impression to those (consumers) who see the advertisement content displayed by a plurality of vehicles 20 in a cooperative manner. Thus, the effectiveness of the advertisement can be enhanced.

(Modification)

In the processing of step S26 in the above-described process, the advertisement distribution server 10 according to the first embodiment picks up all the vehicles 20 whose present locations fall within an area indicated by an area ID from the vehicles 20 that have not been grouped yet (in other words, the vehicles 20 whose group ID field is blank or reads "- - -"). The advertisement distribution server 10 may be modified to pick up all the vehicles 20 whose present locations fall within an area indicated by an area ID from all the vehicles 20 including the vehicles that have already been grouped (i.e. display vehicles). The advertisement distribution server 10 according to the modification may include already grouped vehicles (display vehicles) in display vehicles to be employed to display an advertisement content having another advertisement ID.

For example, in the case illustrated in FIG. 3, it is assumed that the vehicles 20 #1 to 20 #3 have already been grouped and are displaying an advertisement content having a certain advertisement ID (which will be designated as the "advertisement IDa" hereinafter) distributed to this group of vehicles. Here, it is assumed, by way of example, that the advertisement content of the advertisement Ida is displayed in a cooperative manner by display units provided on the left side of the vehicles. If these vehicles are provided with display units on the right side also, the advertisement display system according to the modification can cause the display units on the right side to cooperatively display another advertisement content having an advertisement ID (which will be designated as the "advertisement IDb" hereinafter) different from the advertisement Ida. In other words, the vehicles 20 #1 to 20 #3 can display the advertisement content of the advertisement Ida using the display unit provided on the left side in a cooperative manner and the advertisement content of the advertisement Idb using the display unit provided on the right side in a cooperative manner. This can also apply to the case where the vehicles have display units provided on the rear and the case where the vehicles have display units provided on the top.

The group of vehicles employed to display the advertisement content of the advertisement IDb may be included in the group of vehicles employed to display the advertisement content of the advertisement Ida (for example, the former group may be constituted by the vehicles 20 #2 and 20 #3). Alternatively, the former group may partly overlap with the latter group (for example, the former group may be formed by grouping the vehicle 20 #1 and other vehicles travelling behind it). Each vehicle 20 may send to the advertisement distribution server 10 according to the modification the display status of the respective advertisements of the designated groups in connection with the respective positions of the display units provided on it. The advertisement distribution server 10 according to this modification may manage the display status of the designated groups designated in connection with the display positions as information relating to advertisement contents in the travel record table. Since the advertisement distribution server 10 according to the modification includes already grouped vehicles (display vehicles) in the vehicles from which vehicles to be employed to display an advertisement content are selected, it can increase the opportunities of displaying the advertisement content.

Second Embodiment

Figure 15A:
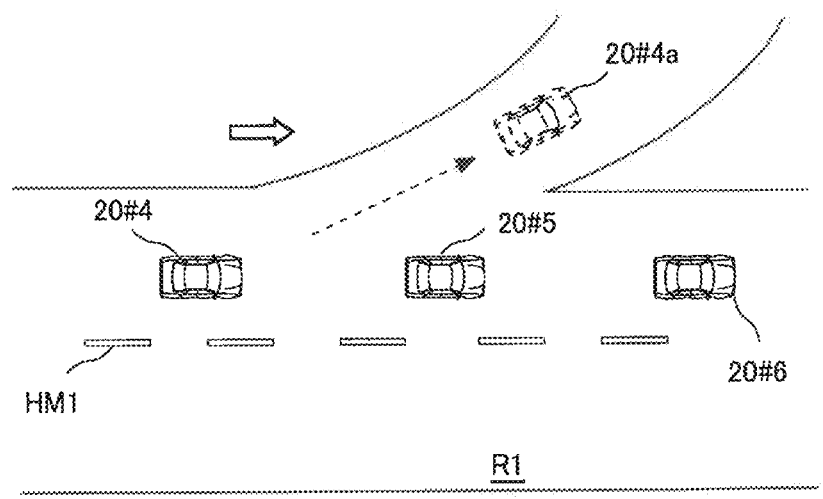
FIGS. 15A and 15B illustrate changes in the circumstances of grouped vehicles.
Figure 15B:
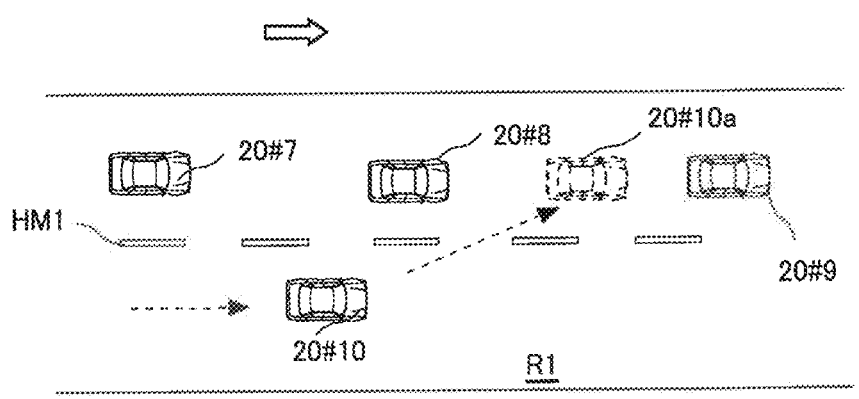

The circumstances of grouped vehicles are supposed to change with time. FIGS. 15A and 15B illustrate changes in the circumstances of grouped vehicles. The vehicles 20 #4, 20 #5, and 20 #6 in FIG. 15A are grouped, and the vehicles 20 #7, 20 #8, an 20 #9 in FIG. 15B are grouped. It is assumed that the vehicles of each group are travelling the road R1 in the direction indicated by the hollow arrow while displaying an advertisement content of a certain advertisement ID distributed to the vehicle group.

There may be a case where one (or some) of the vehicles 20 that belong to a group changes the direction or speed of travel to leave the group. FIG. 15A shows an illustrative case where one vehicle 20 #4 in the grouped vehicles changes its direction of travel to enter a road branching off from the road R1. The vehicle 20 #4 entering the branch road is presently located at the location illustrated by phantom lines. In the circumstance illustrated in FIG. 15A, the integral display of the advertisement content, which had been provided by the group of vehicles 20 #4 to 20 #6 cooperatively before the change in the circumstances, has been broken to lose the unity.

There may be another case where another vehicle 20 enters into the line of grouped vehicles travelling in line. FIG. 15B shows an illustrative case where a vehicle 20 #10 coming from behind overtakes some of the grouped vehicles 20 #7 to 20 #9 to enter between the vehicle 20 #8 and vehicle 20 #9. The integral display of the advertisement content, which had been provided by the vehicles cooperatively, is interrupted at the location of the entrance of the other vehicle (20 #10) (between the vehicle 20 #8 and the vehicle 20 #9) to lose the unity.

An advertisement display system 1 according to the second embodiment is configured to detect changes in the circumstances of grouped vehicles with time and determine dissolution of the group. The vehicles belonging to the group that is determined to be dissolved are informed of the dissolution of the group. The advertisement display system 1 according to the second embodiment performs the advertisement distribution process according to the flow chart in FIGS. 13 and 14 for vehicles including vehicles whose grouping has been dissolved. Even if the circumstances of grouped vehicles change, the advertisement display system according to the second embodiment can select and display advertisement contents in a way that is suitable for the circumstances after the change.

Figure 16:
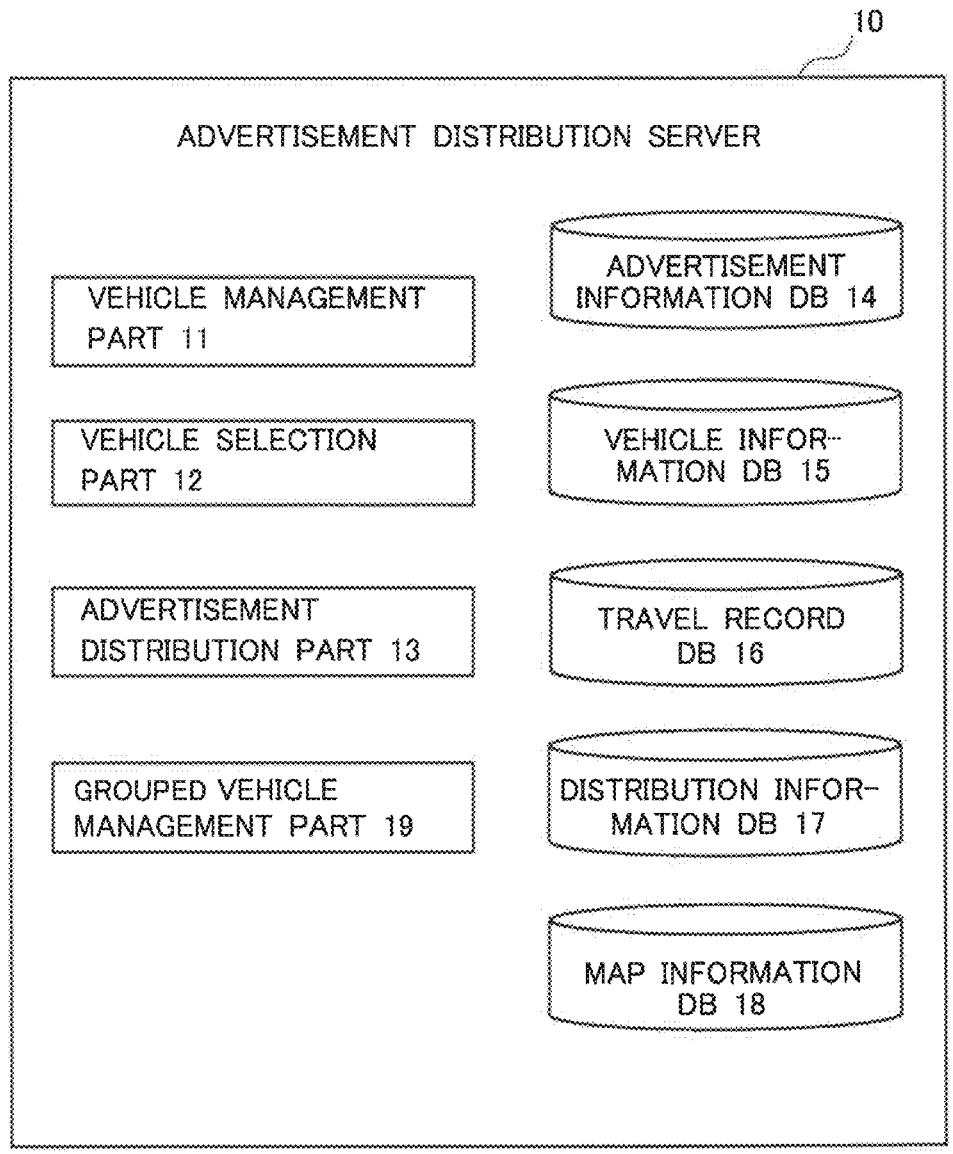
FIG. 16 is a diagram illustrating an exemplary functional configuration of the advertisement distribution server according to a second embodiment.

FIG. 16 is a diagram illustrating an exemplary functional configuration of the advertisement distribution server 10 according to the second embodiment. The advertisement distribution server 10 illustrated in FIG. 16 differs from the advertisement distribution server 10 according to the first embodiment in the inclusion of a grouped vehicle management part 19 as a functional component. The hardware configuration of the advertisement distribution server 10 and the vehicles 20 in the advertisement display system 1 according to the second embodiment is the same as that according to the first embodiment and will not be described further. In the following, features that are different from those in the first embodiment will be mainly described.

Referring to FIG. 16, the grouped vehicle management part 19 monitors changes in the circumstances of the vehicles that have been grouped and registered in the distribution information database 17. When a change in the location information, speed information, or the information indicating the direction of travel of each of the vehicles belonging to a group occurs, the grouped vehicle management part 19 determines dissolution of the group. Then, the grouped vehicle management part 19 notifies the vehicles belonging to the group of dissolution of the group and deletes the record of the group ID of the group from the distribution information database 17. The information relating the display of advertisement content concerning grouped vehicles stored in the distribution information database 17 is updated in accordance with the latest circumstances.

Process of Operation

Figure 17:
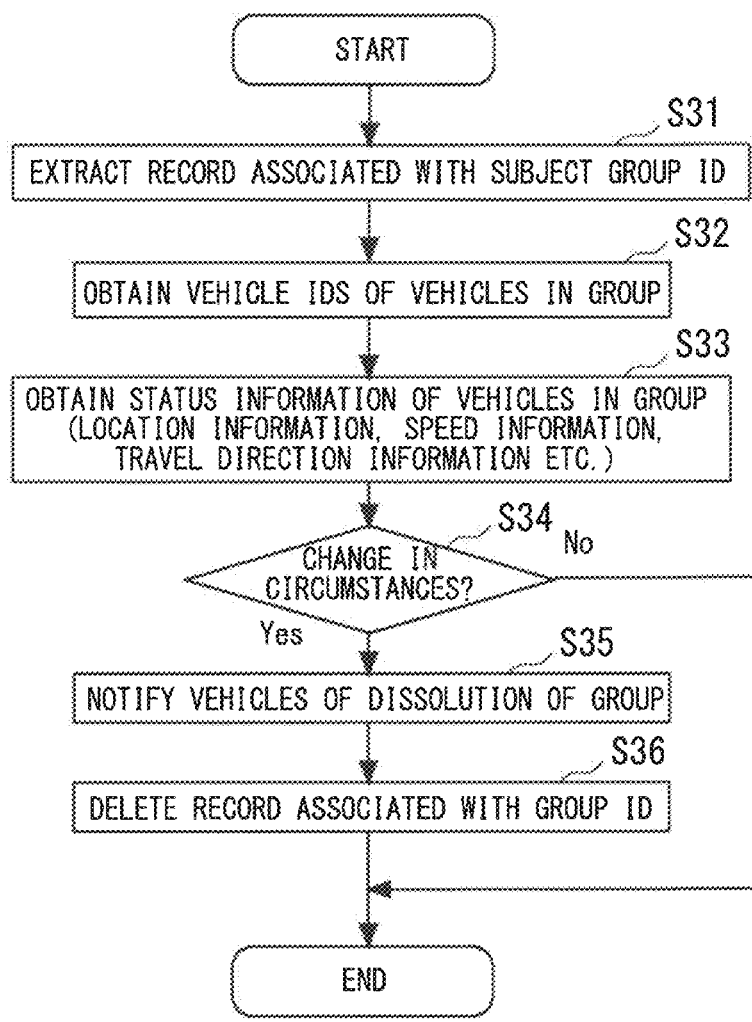
FIG. 17 is a flow chart of an exemplary grouped vehicle management process.

A process performed by the advertisement distribution server 10 according to the second embodiment will be described with reference to FIG. 17. FIG. 17 is a flow chart of a grouped vehicle management process. By the process illustrated in FIG. 17, the advertisement distribution server 10 detects a change in the circumstances of a group of vehicles to which an advertisement content has been distributed and makes a determination as to dissolution of the group intended for displaying the advertisement content. The process according to the flow chart in FIG. 17 is performed periodically for each group ID registered in the distribution information database 17.

In step S31 in the process according the flow chart in FIG. 12, the advertisement distribution server 10 consults the distribution information database 17 to extract the record associated with the subject group ID (i.e. the group ID for which this process is performed). The extracted record is temporarily stored in a certain area of the main storage unit 102. In step S32, the advertisement distribution server 10 retrieves the respective vehicles IDs of the vehicles that constitute the group from the extracted record. The retrieved vehicle IDs are passed to the processing of step S33.

In step S33, the advertisement distribution server 10 retrieves the status information associated with each vehicle ID. For example, the advertisement distribution server 10 consults the travel record database 16 to retrieve information relating to the latest travel status from the travel record table associated with each vehicle ID. Specifically, the location information, the speed information, the information indicating the direction of travel of each of the vehicles constituting the group. The advertisement distribution server 10 temporarily stores the retrieved status information of the vehicles in a certain area of the main storage unit 102 in association with the subject group ID. Then, the process proceeds to step S34.

In step S34, it is determined whether the circumstances of the grouped vehicles has changed. For example, the advertisement distribution server 10 determines whether the circumstances have changed based on the invalidity of the condition that differences in the speeds of the grouped vehicles indicated by the speed information fall within a certain range (e.g. ±2 km/h), their locations indicated by the location information fall within a certain area, and their directions of travel are the same. If the grouped vehicles meet the above condition (then, No in step S34), the advertisement distribution server 10 terminates the process illustrated in FIG. 17. This is because when the grouped vehicles meet the above condition, it may be concluded that the circumstances allow the cooperative display of the advertisement content distributed to the group to be maintained.

On the other hand, if the grouped vehicles do not meet the above condition (then, Yes in step S34), the advertisement distribution server 10 determines dissolution of the group and executes the processing of step S35 next. This is because when the grouped vehicles do not meet the above condition, it may be concluded that the change in the circumstances has made it difficult to maintain the cooperative display of the advertisement content distributed to the group.

In step S35, the advertisement distribution server 10 notifies each of the vehicles in the group of dissolution of the group. Specifically, the advertisement distribution server 10 sends a notice of dissolution with the designation of the group ID of the group to be dissolved to each of the vehicles that constitute the group. On the basis of the group ID designated by the notice of dissolution sent to each vehicle 20, the vehicle 20 stops displaying the advertisement content of the advertisement ID associated with the designated group ID. Then, the vehicle 20 sends to the advertisement distribution server 10 information indicating the absence of an advertisement ID distributed to it (e.g. the sign "- - -" or a blank field). As to the group ID and the display status of advertisement content also, the vehicle 20 sends to the advertisement distribution server 10 similar information, such as the sign "- - -" or a blank field.

In step S36, the advertisement distribution server 10 deletes the record associated with the subject group ID from the distribution information database 17. Thus, the distribution information database 17 is updated in accordance with the circumstances of the group of vehicles that is determined to be dissolved. After the completion of the processing of step S36, the process according to the flow chart in FIG. 17 ends.

By the above-described process, the advertisement distribution server 10 can detect a change in the circumstances of a group of vehicles and determine dissolution of the group intended for displaying an advertisement content. The detection of a change in the circumstances is carried out on the basis of the status information of the vehicles that constitute the group. For example, the advertisement distribution server 10 may determine dissolution of a group based on the invalidity of the condition that differences in the speeds of the grouped vehicles indicated by the speed information fall within a certain range (e.g. ±2 km/h), their locations indicated by the location information fall within a certain area, and their directions of travel are the same. For example, in the case illustrated in FIG. 15A where one of the vehicles 20 constituting a group changes its direction and speed of travel to leave the group, the advertisement distribution server 10 can determine dissolution of the group. In the case illustrated in FIG. 15B where a vehicle 20 (vehicle 20 #10) that is not a member of a group enters between travelling vehicles 20 that are members of the group, the advertisement distribution server 10 can determine dissolution of the group. The advertisement display system 1 according to the second embodiment can perform the advertisement distribution process according to the flow chart in FIGS. 13 and 14 for vehicles including vehicles whose grouping has been dissolved. Even when the circumstances of grouped vehicles change, the advertisement display system 1 according to the second embodiment can select and display advertisement contents appropriately in a manner adapted to the circumstances after the change. For example, in the illustrative case in FIG. 15B, the system can reorganize the group to include the vehicle 20 #10 that has entered between two vehicles in it and cause the vehicle 20 #10 to display an advertisement content in cooperation with the other vehicles in the group.

First Modification

In the processing of dissolving a group of vehicles with a change in the circumstances in steps S34 and S35 in the second embodiment, the area in which the vehicles are travelling may be taken into account in the condition for determining dissolution of the group. Specifically, when the grouped vehicles travel out of the area designated by the area ID associated with the advertisement ID, the group may be determined to be dissolved. In this first modification of the second embodiment, when grouped vehicles travel out of the area designated by the area ID, the group is temporarily dissolved. Then, the advertisement distribution server 10 may send a new advertisement ID suitable for the new area to the group to cause it to continue to display the advertisement. In this case, the advertisement distribution server 10 may continue to use the group ID before dissolution stored in the distribution information database 17 and update the information relating to display of the advertisement content (including advertisement Id, advertisement data, and area ID etc.).

Second Modification

One of the vehicles 20 in a group may be designated as a leader in displaying an advertisement content. The system according to the second modification selects vehicle 20 that it to act as the leader from among grouped vehicles. This vehicle will be hereinafter referred to as the "leader vehicle". The leader vehicle 20 in a group may obtain the status information of the other vehicles in the group by inter-vehicle communication or road-to-vehicle communication and carry out the detection of a change in the circumstances according to the second embodiment on the basis of the status information of the vehicles thus obtained. The leader vehicle 20 according to the second modification may dissolve the group in response to a change in the circumstances and notify the advertisement distribution server 10 of the dissolution. The second modification can reduce the load on the advertisement distribution server 10 after grouping.

The advertisement distribution server 10 according to the second embodiment selects a leader vehicle 20 from among the vehicles to which a group ID has been assigned. For example, in the case where an advertisement content is to be displayed by three vehicles cooperatively as in the illustrative case in FIG. 3, the vehicle 20 #2 sandwiched between vehicles ahead and behind may be selected as the leader vehicle 20. This is because this vehicle 20 #2 can obtain or receive the status information from both the vehicle 20 #3 ahead and the vehicle 20 #1 behind located in an area that allows grouping, by inter-vehicle communication. The advertisement distribution server 10 assigns an identifier designating the leadership to the selected vehicle 20 and stores the identifier in the distribution information database 17 in association with the vehicle ID. The advertisement distribution server 10 sends the identifier designating the leadership to the leader vehicle 20. The leader vehicle 20 stores the identifier sent to it in, for example, the auxiliary storage unit 204.

Figure 18:
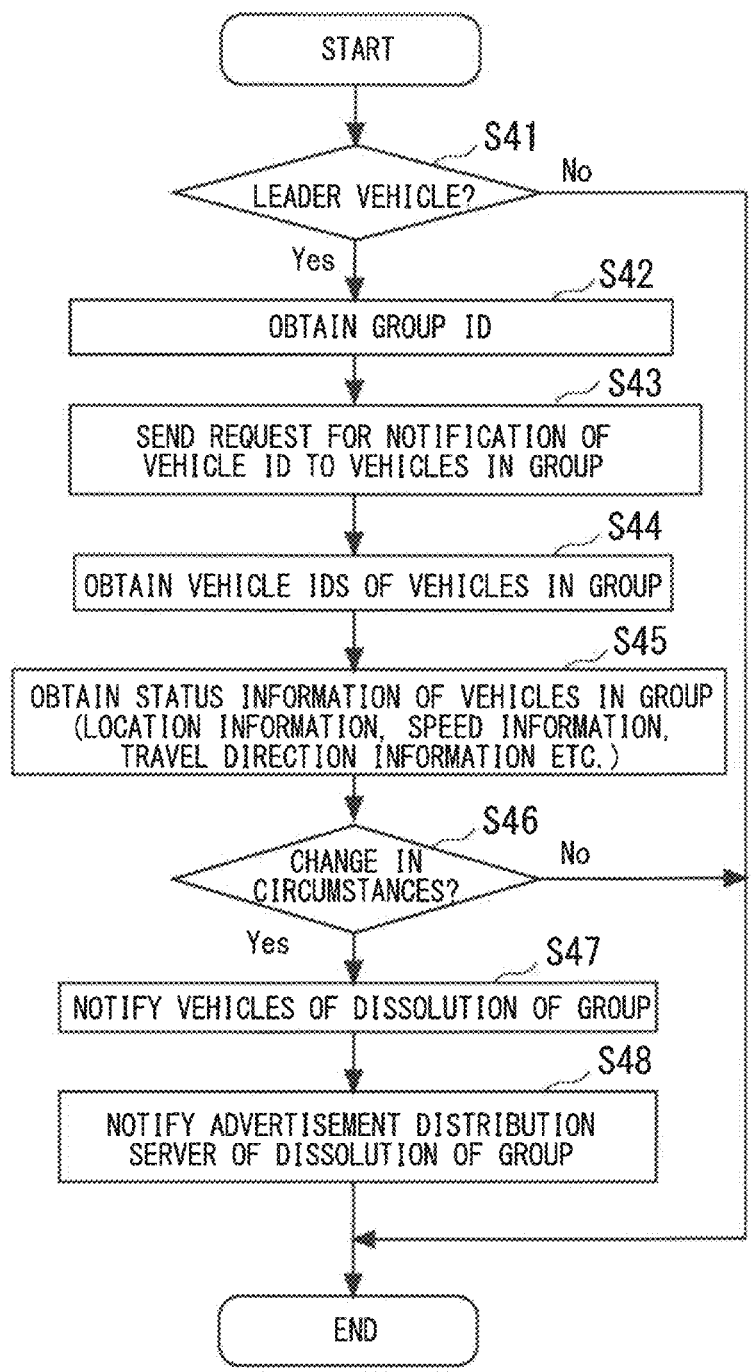
FIG. 18 is a flow chart of an exemplary process of managing grouping of vehicles according to a modification.

FIG. 18 is a flow chart of a group management process executed by the vehicle 20. This process is executed at regular intervals. In step S41 of the process according to the flow chart in FIG. 18, the vehicle 20 determines whether or not the vehicle 20 is the leader vehicle. Whether the vehicle 20 is the leader vehicle is determined based on the identifier indicating the leader vehicle. In step S42, the vehicle 20 receives a group ID sent to it. The group ID identifies a group of vehicles that are to display an advertisement content cooperatively.

In step S43, the leader vehicle 20 sends a request for notification of the vehicle ID to the vehicles located ahead and behind by inter-vehicle communication. Then in step S44, the leader vehicle 20 obtains the vehicle IDs notified of by the vehicles in response to the request and stores the vehicle IDs in a certain area of the main storage unit 203 in association with the group ID.

Then in step S45, the leader vehicle 20 obtains the status information from the vehicle of each of the vehicle IDs it has obtained. Specifically, for example, the leader vehicle 20 sends a request for sending location information, speed information, and information indicating the direction of travel to the vehicles of the vehicle IDs. Then, the leader vehicle 20 receives the status information of the vehicles of the vehicle IDs sent in response to the request. The leader vehicle 20 temporarily stores the status information thus obtained in a certain area of the main storage unit 203 in association with the respective vehicle IDs.

In step S46, the leader vehicle 20 makes a determination as to dissolution of the group based on a change in the circumstances in the same manner as in the processing of step S34 in the process according to the flow chart in FIG. 17. The leader vehicle 20 may determine dissolution of the group with a change in the circumstances, based on the invalidity of the condition that differences in the speeds of the grouped vehicles indicated by the speed information fall within a certain range (e.g. 12 km/h), their locations indicated by the location information fall within a certain area, and their directions of travel are the same. If the vehicles in the group meet the above condition (then, No in step S46), the leader vehicle 20 terminates the process illustrated in FIG. 18. On the other hand, if the vehicles in the group do not meet the above condition (then, Yes in step S46), the leader vehicle 20 determines dissolution of the group upon detection of a change in the circumstances and executes the processing of step S47 next.

In step S47, the leader vehicle 20 notifies each of the vehicles in the group of dissolution of the group. Specifically, the leader vehicle 20 sends a notice of dissolution with the designation of the group ID of the group to be dissolved to each of the vehicles that constitute the group. Each of the vehicles notified of dissolution of the group by the leader vehicle 20 stops displaying the advertisement content of the advertisement ID associated with the group ID designated in the notice. Then, each of the vehicles sends to the advertisement distribution server 10 information indicating the absence of an advertisement ID distributed to it (e.g. the sign "- - -" or a blank field).

In step S48, the leader vehicle 20 sends the group ID of the dissolved group to the advertisement distribution server 10. Moreover, the leader vehicle 20 sends the status information obtained from the vehicles to the advertisement distribution server 10. After the completion of step S48, the process according to the flow chart in FIG. 18 ends. After receiving the group ID of the dissolved group from the leader vehicle 20, the advertisement distribution server 10 executes the processing same as step S36 in the process according to the flow chart in FIG. 17 to update the distribution information database 17.

As above, in the case where a leader vehicle is selected also, the advertisement display system 1 according to the second modification can detect a change in the circumstances on the basis of the status information of the vehicles that constitute a group. The advertisement display system 1 according to the second modification can obtain the status information of the vehicles in a group by inter-vehicle communication between the leader vehicle 20 and the other vehicles in the group. The leader vehicle 20 according to the second modification can dissolve the group of vehicles upon detection of a change in the circumstances and notify the advertisement distribution server 10 of the dissolution.

The advertisement display system 1 according to the second modification also can determine dissolution of a group in the case illustrated in FIG. 15A where one (or some) of the vehicles 20 constituting the group changes its direction and speed of travel to leave the group. The advertisement display system 1 according to the second modification also can determine dissolution of a group in the case illustrated in FIG. 15B where a vehicle 20 (vehicle 20 #10) that is not a member of the group enters between travelling vehicles 20 that are members of the group.

Other Embodiments

The above embodiments are only for the illustrative purpose. Appropriate modifications can be made thereto without departing from the essence of the present disclosure. The processing and means that have been described in the foregoing may be employed in any combination so long as it is technically feasible to do so.

A process described to be performed by one apparatus may be performed by a plurality of apparatuses in a distributed manner. A process described to be performed by different apparatuses may be performed by a single apparatus. The hardware configuration (or server configuration) employed to implement the functions of a computer system may be modified flexibly.

A program by which a machine or apparatus, such as an information processing apparatus can implement one of the functions described in the foregoing may be stored in a recording medium that can be read by such a machine or apparatus (which will be hereinafter referred to as "computer or the like"). The function may be implemented by causing the computer or the like to load the program stored in the recording medium and execute it.

The recording medium that can be read by a computer or the like refers to a recording medium that can store information, such as data and programs electrically, magnetically, optically, mechanically, or chemically in such a way as to allow the computer or the like to read the stored information. Examples of such a recording medium that is detachable from the computer or the like include a flexible disc, a magneto-optical disc, a CD-ROM, a CD-R/W, a DVD, a Blu-ray disc, a DAT, a 8 mm tape, and a memory card, such as a flash memory. Examples of such a recording disc fixed to the computer or the like include a hard disk and a ROM.

What is claimed is:

1. An information processing apparatus comprising:
a storage that stores:
an advertisement information database comprising an advertisement and information associated with the advertisement;
a vehicle information database comprising information on a first plurality of vehicles; and
a travel record database comprising location information, speed information, and travelling direction information for the first plurality of vehicles; and
a processor programmed to:
obtain specific information including the location information, the speed information, and the travelling direction information, for the first plurality of vehicles from the travel record database, each of the first plurality of vehicles having an advertisement display panel, the advertisement display panel being configured to display the advertisement on the outside of the vehicle;
select, from among the first plurality of vehicles, a second plurality of vehicles, based on the location information, the speed information, and the traveling direction information;
control the second plurality of vehicles to cause the advertisement display panels to display the advertisement cooperatively, wherein the cooperatively displayed advertisement is a single image having separate parts, each part of the single image being displayed by separate vehicles of the second plurality of vehicles;
detect a change in circumstances caused by an entrance of another vehicle between two vehicles among the second plurality of vehicles or the departure of one or more vehicles;
notify the second plurality of vehicles that the second plurality of vehicles will be dissolved; and
change a mode of display of the advertisement displayed by the second plurality of vehicles when the change in the circumstances is detected, so as to instruct the second plurality of vehicles to stop the display of the cooperatively displayed advertisement.

2. The information processing apparatus according to claim 1, wherein
the specific information further includes information about a type of each vehicle, the type of each vehicle being specified in the vehicle information database, and
the processor is further programmed to select the second plurality of vehicles by selecting vehicles that are a same vehicle type.

3. The information processing apparatus according to claim 1, wherein
the vehicle information database comprises property information regarding the second plurality of vehicles, and
the processor is programmed to:
obtain the property information about the second plurality of vehicles from the vehicle information database, the property information including information about at least one of a display area of the advertisement display panel and a position of the advertisement display panel; and
determine a mode of display of the advertisement based on the property information obtained from the second plurality of vehicles.

4. The information processing apparatus according to claim 1, wherein the second plurality of vehicles includes a primary vehicle and at least one additional vehicle within a predetermined range of the primary vehicle.

5. The information processing apparatus according to claim 1, wherein the second plurality of vehicles each have a speed within a predetermined speed range.

6. The information processing apparatus according to claim 1, wherein the second plurality of vehicles each have a same traveling direction.

7. A non-transitory computer readable storing medium recording a computer program for causing a computer to execute processing of:
storing an advertisement information database comprising an advertisement and information associated with the advertisement;

storing a vehicle information database comprising information on a first plurality of vehicles;

storing a travel record database comprising location information, speed information, and travelling direction information for the first plurality of vehicles;

obtaining specific information including the location information, the speed information, and the travelling direction information, for the first plurality of vehicles from the travel record database, each of the first plurality of vehicles having an advertisement display panel, the advertisement display panel being configured to display the advertisement on the outside of the vehicle;

selecting, from among the first plurality of vehicles, a second plurality of vehicles based on the location information, the speed information, and the traveling direction information;

controlling the second plurality of vehicles to cause the advertisement display panels to display the advertisement cooperatively, wherein the cooperatively displayed advertisement is a single image having separate parts, each part of the single image being displayed by separate vehicles of the second plurality of vehicles;

detecting a change in circumstances caused by an entrance of another vehicle between two vehicles among the second plurality of vehicles or the departure of one or more vehicles;

notifying the second plurality of vehicles that the second plurality of vehicles will be dissolved; and changing a mode of display of the advertisement displayed by the second plurality of vehicles when the change in the circumstances is detected, so as to instruct the second plurality of vehicles to stop the display of the cooperatively displayed advertisement.

8. An information processing method comprising:

storing an advertisement information database comprising an advertisement and information associated with the advertisement;

storing a vehicle information database comprising information on a first plurality of vehicles;

storing a travel record database comprising location information, speed information, and travelling direction information for the first plurality of vehicles;

obtaining specific information including the location information, the speed information, and the travelling direction information, for the first plurality of vehicles from the travel record database, each of the first plurality of vehicles having an advertisement display panel, the advertisement display panel being configured to display the advertisement on the outside of the vehicle;

selecting, from among the first plurality of vehicles, a second plurality of vehicles based on the location information, the speed information, and the traveling direction information;

controlling the second plurality of vehicles to cause the advertisement display panels to display the advertisement cooperatively, wherein the cooperatively displayed advertisement is a single image having separate parts, each part of the single image being displayed by separate vehicles of the second plurality of vehicles;

detecting a change in circumstances caused by an entrance of another vehicle between two vehicles among the second plurality of vehicles or the departure of one or more vehicles;

notifying the second plurality of vehicles that the second plurality of vehicles will be dissolved; and changing a mode of display of the advertisement displayed by the second plurality of vehicles when the change in the circumstances is detected, so as to instruct the second plurality of vehicles to stop the display of the cooperatively displayed advertisement.

\* \* \* \* \*